United States Patent
Nito

(10) Patent No.: US 11,409,218 B2
(45) Date of Patent: Aug. 9, 2022

(54) IMAGE FORMING APPARATUS

(71) Applicant: CANON KABUSHIKI KAISHA, Tokyo (JP)

(72) Inventor: Yuta Nito, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 8 days.

(21) Appl. No.: 17/159,645

(22) Filed: Jan. 27, 2021

(65) Prior Publication Data

US 2021/0247713 A1 Aug. 12, 2021

(30) Foreign Application Priority Data

Feb. 6, 2020 (JP) .............................. JP2020-019178

(51) Int. Cl.
| | |
|---|---|
| *G03G 15/00* | (2006.01) |
| *H02P 21/10* | (2016.01) |
| *G03G 21/16* | (2006.01) |
| *H02P 27/12* | (2006.01) |
| *H02P 21/22* | (2016.01) |

(52) U.S. Cl.
CPC ..... *G03G 15/5004* (2013.01); *G03G 21/1633* (2013.01); *H02P 21/10* (2013.01); *H02P 21/22* (2016.02); *H02P 27/12* (2013.01)

(58) Field of Classification Search
CPC ....................... G03G 15/5004; G03G 21/1633; H02P 21/22; H02P 21/10; H02P 27/12
See application file for complete search history.

(56) References Cited

U.S. PATENT DOCUMENTS

| | | | | |
|---|---|---|---|---|
| 2014/0139173 A1* | 5/2014 | You | ........................... | H02P 8/38 318/696 |
| 2015/0277322 A1* | 10/2015 | Doshida | ............. | G03G 15/5008 399/167 |
| 2019/0218047 A1 | 7/2019 | Miyazawa et al. | | |

FOREIGN PATENT DOCUMENTS

JP 2017046469 A 3/2017

* cited by examiner

*Primary Examiner* — Zoheb S Imtiaz
(74) *Attorney, Agent, or Firm* — Canon U.S.A., Inc. IP Division

(57) ABSTRACT

An image forming apparatus according to the present disclosure includes a power supply circuit, a driving circuit, an opening/closing unit, a first switch configured to switch to a connected state and a disconnected state, at least one processor including a first mode for executing vector control for controlling the driving circuit and a second mode for controlling the driving circuit.

The at least one processor is configured to determine a rotational phase using a detected current and a set control value, to control the driving circuit, to execute discriminating a type of the motor based on the detected current in the second mode, and to set the control value based on a result of the discriminating. The result based on the detected current in a state where the first switch is in the disconnected state is not used to set the control value.

25 Claims, 14 Drawing Sheets

IMAGE FORMING APPARATUS

BACKGROUND

Field of the Disclosure

The present disclosure relates to an image forming apparatus that distinguishes the type of motor.

Description of the Related Art

Conventionally, a configuration for distinguishing the type of motor connected to a motor control device that controls a motor is known. Japanese Patent Application Laid-Open No. 2017-46469 discusses a technique for, when a power supply of an image forming apparatus is turned on, executing the process of distinguishing the type of motor (hereinafter referred to as a "distinction process"). In the distinction process in Japanese Patent Application Laid-Open No. 2017-46469, the supply of a current to a motor, the detection of the current flowing through each coil of the motor, and the distinction of the type of motor based on the detection result are executed.

US2019/0218047 discusses a configuration in which a door for exposing a conveying path to outside is provided in an image forming apparatus.

In the image forming apparatus, an interlock switch is provided to prevent power from a power supply from being supplied to devices within the image forming apparatus in the state where the door is opened. In the state where the door is opened, the interlock switch is disconnected, and power from the power supply is not supplied to the devices. In the state where the door is closed, the interlock switch is connected, and power from the power supply is supplied to the devices.

In the configuration of Japanese Patent Application Laid-Open No. 2017-46469, for example, if the power supply of the image forming apparatus enters an on state and the distinction process is executed in the state where a door in the image forming apparatus is opened, the following issue may arise. Specifically, due to the state where the door is opened and an interlock switch is disconnected, a current may not be supplied to a motor. If the distinction process is executed in the state where a current is not supplied to a motor, the motor may be erroneously distinguished.

SUMMARY

Some embodiments in the present disclosure are directed to preventing the type of motor from being erroneously distinguished.

According to an aspect of some embodiments, an image forming apparatus including an image forming unit configured to form an image on a recording medium includes a power supply circuit to which power is supplied from a commercial power supply, a driving circuit configured to supply a current supplied from the power supply circuit to a coil of a motor connected to the driving circuit, an opening/closing unit configured to be opened and closed to access inside of the image forming apparatus, a first switch configured to switch to a connected state where the power supply circuit and the driving circuit are connected together, and a disconnected state where the power supply circuit is disconnected from the driving circuit, the first switch being in the connected state in a state where the opening/closing unit is closed, and being in the disconnected state in a state where the opening/closing unit is opened, and at least one processor configured to detect a current flowing through the coil, to determine a rotational phase of a rotor of the motor using the detected current and a set control value, to control the driving circuit, wherein the at least one processor includes a first mode for executing vector control for controlling the driving circuit based on a torque current component that is a current component represented in a rotating coordinate system based on the determined rotational phase and is also a current component that generates a torque in the rotor of the motor, and a second mode for controlling the driving circuit based on a target value of a current that is to be supplied to the coil, the target value set to a value determined in advance, to execute discriminating a type of the motor connected to the driving circuit based on the detected current in the second mode; and to set the control value based on a result of the discriminating. The result of the discriminating based on the detected current in a state where the first switch is in the disconnected state is not used to set the control value. The at least one processor sets the control value based on the result of the discriminating based on the detected current in a state where the first switch is in the connected state.

Further features of various embodiments will become apparent from the following description of exemplary embodiments with reference to the attached drawings.

DESCRIPTION OF THE EMBODIMENTS

With reference to the drawings, suitable exemplary embodiments will be described below. However, the shapes and the relative arrangement of components described in these exemplary embodiments should be appropriately changed depending on the configuration of an apparatus to which the present disclosure is applied and various conditions, and some embodiments are not limited to the following exemplary embodiments. In the following description, a case is described where a motor control device is provided in an image forming apparatus. The motor control device, however, may be provided not only in an image forming apparatus. For example, the motor control device may also be used in a sheet conveying apparatus that conveys a sheet, such as a recording medium or a document.

[Image Forming Apparatus]

Figure 1:
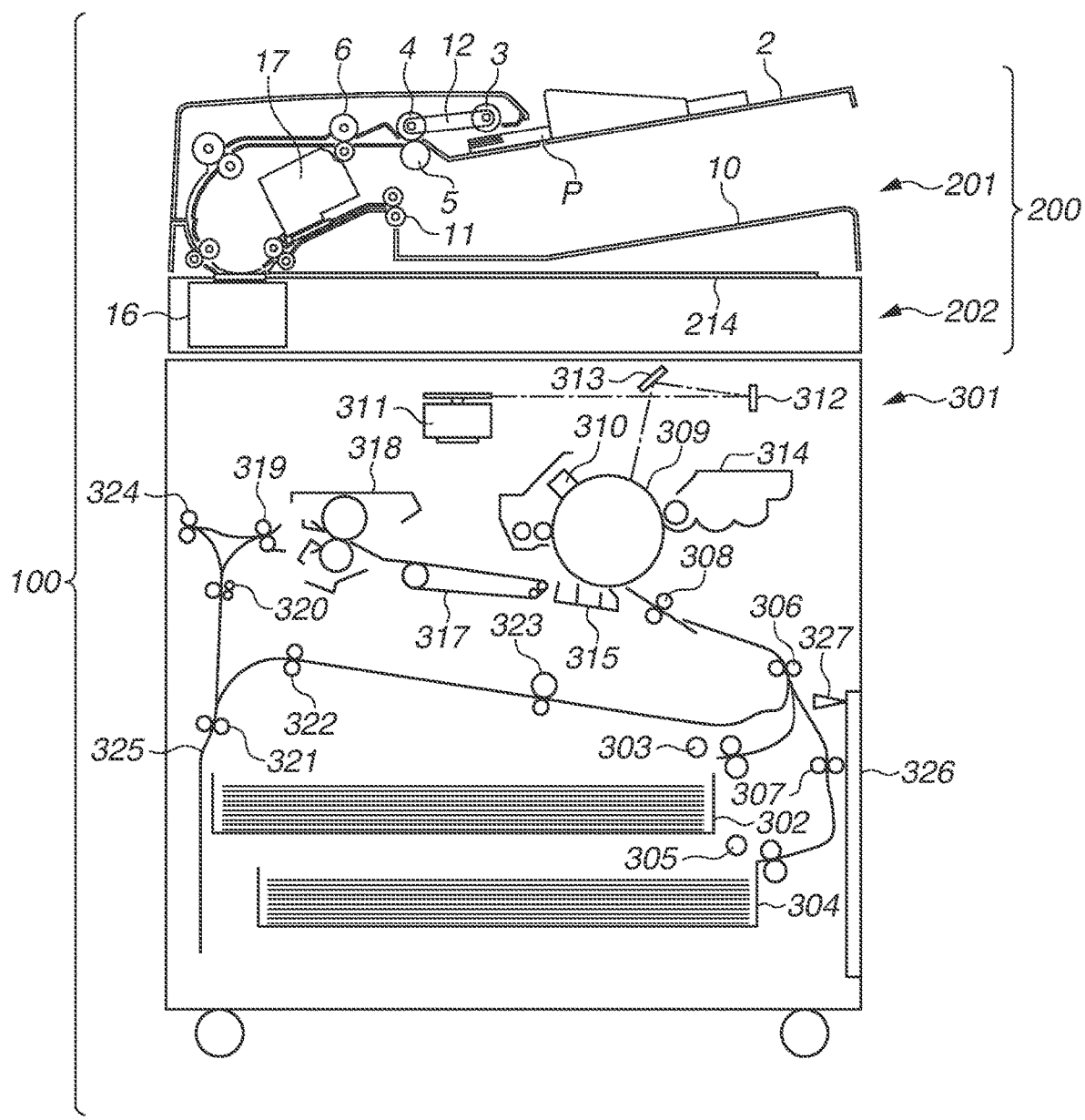
FIG. 1 is a cross-sectional view illustrating an image forming apparatus according to a first exemplary embodiment.

FIG. 1 is a cross-sectional view illustrating the configuration of a monochrome electrophotographic copying machine (hereinafter referred to as "image forming apparatus") 100 that includes a sheet conveying apparatus used in a first exemplary embodiment. The image forming apparatus 100 is not limited to a copying machine, and may be, for example, a facsimile apparatus, a printing machine, or a printer. A recording method is not limited to an electrophotographic method, and may be, for example, an inkjet method. Further, the format of the image forming apparatus 100 may be either of monochrome and color formats.

With reference to FIG. 1, the configuration and the function of the image forming apparatus 100 are described below. As illustrated in FIG. 1, the image forming apparatus 100 includes a document reading apparatus 200 including a document feeding apparatus 201 and a reading apparatus 202, and an image printing apparatus 301. The document feeding apparatus 201 is pivotable relative to the reading apparatus 202.

<Document Reading Apparatus>

Documents P stacked in a document stacking unit 2 of the document feeding apparatus 201 are fed one by one by a pickup roller 3. Then, each document P is conveyed further downstream by a feeding roller 4. At a position opposed to the feeding roller 4, a separation roller 5 is provided that is in pressure contact with the feeding roller 4. The separation roller 5 is configured to rotate if a load torque greater than or equal to a predetermined torque is applied to the separation roller 5. The separation roller 5 has the function of separating two documents fed in an overlapping state.

The pickup roller 3 and the feeding roller 4 are linked together by a swinging arm 12. The swinging arm 12 is supported by the rotating shaft of the feeding roller 4 so that the swinging arm 12 can pivot about the rotating shaft of the feeding roller 4.

The document P is conveyed by various conveying rollers, such as the feeding roller 4 and a conveying roller 6, and discharged to a sheet discharge tray 10 by sheet discharge rollers 11.

In the reading apparatus 202, a document reading unit 16 is provided that reads an image on a first surface of the conveyed document P. Image information regarding the image read by the document reading unit 16 is output to the image printing apparatus 301.

In the document feeding apparatus 201, a document reading unit 17 is provided that reads an image on a second surface of the conveyed document P. Image information regarding the image read by the document reading unit 17 is output to the image printing apparatus 301 similarly to the method of the document reading unit 16 described above.

As described above, a document is read.

Document reading modes include a first reading mode and a second reading mode. The first reading mode is a mode for reading an image on a document conveyed by the above method. The second reading mode is a mode where the document reading unit 16 moving at a constant velocity reads an image on a document placed on document glass 214 (a transparent member). The document is placed on the document glass 214 in the state where the document feeding apparatus 201 is pivoted relative to the reading apparatus 202. Normally, an image on a sheet-like document is read in the first reading mode, and an image on a bound document, such as a book or a booklet, is read in the second reading mode.

<Image Printing Apparatus>

Sheet holding trays 302 and 304 are provided within the image printing apparatus 301. In the sheet holding trays 302 and 304, different types of recording media can be held. For example, A4-size plain paper is held in the sheet holding tray 302, and A4-size thick paper is held in the sheet holding tray 304. On each of the recording media, an image is to be formed by the image forming apparatus 100. For example, the recording media include a sheet, a resin sheet, cloth, an overhead projector (OHP) sheet, and a label.

A recording medium held in the sheet holding tray 302 is fed by a pickup roller 303 and sent out to registration rollers 308 by conveying rollers 306. A recording medium held in the sheet holding tray 304 is fed by a pickup roller 305 and sent out to the registration rollers 308 by conveying rollers 307 and the conveying rollers 306.

An image signal output from the document reading apparatus 200 is input to an optical scanning device 311 that includes a semiconductor laser and a polygon mirror. The outer peripheral surface of a photosensitive drum 309 is charged by a charging device 310. After the outer peripheral surface of the photosensitive drum 309 is charged, laser light according to the image signal input from the document reading apparatus 200 to the optical scanning device 311 is emitted from the optical scanning device 311 to the outer peripheral surface of the photosensitive drum 309 via the polygon mirror and mirrors 312 and 313. As a result, an electrostatic latent image is formed on the outer peripheral surface of the photosensitive drum 309.

Next, the electrostatic latent image is developed with toner in a developing device 314, thereby forming a toner image on the outer peripheral surface of the photosensitive drum 309. The toner image formed on the photosensitive drum 309 is transferred onto the recording medium by a transfer charging device 315 as a transfer unit provided at a position (a transfer position) opposed to the photosensitive drum 309. According to the transfer timing when the transfer charging device 315 transfers the image onto the recording medium, the registration rollers 308 send the recording medium into the transfer position.

The recording medium onto which the toner image has been transferred as described above is sent into a fixing device 318 by a conveying belt 317 and is heated and pressurized by the fixing device 318, thereby fixing the toner image to the recording medium. In this manner, an image is formed on a recording medium by the image forming apparatus 100.

In a case where an image is formed in a one-sided printing mode, the recording medium having passed through the fixing device 318 is discharged to a sheet discharge tray (not illustrated) by sheet discharge rollers 319 and 324. In a case where an image is formed in a two-sided printing mode, a fixing process is performed on a first surface of the recording medium by the fixing device 318, and then, the recording medium is conveyed to a reverse path 325 by the sheet discharge rollers 319, conveying rollers 320, and reverse rollers 321. Then, the recording medium is conveyed to the registration rollers 308 again by conveying rollers 322 and 323, and an image is formed on a second surface of the recording medium by the above method. Then, the recording medium is discharged to the sheet discharge tray (not illustrated) by the sheet discharge rollers 319 and 324.

In a case where the recording medium where on the first surface thereof an image is formed is discharged face down to outside the image forming apparatus 100, the recording medium having passed through the fixing device 318 is conveyed through the sheet discharge rollers 319 in a direction toward the conveying rollers 320. Then, immediately before the rear end of the recording medium passes through a nip portion of the conveying rollers 320, the rotation of the conveying rollers 320 is reversed, thereby discharging the recording medium to outside the image forming apparatus 100 via the sheet discharge rollers 324 in the state where the first surface of the recording medium faces down.

In the image forming apparatus 100 according to the present exemplary embodiment, a door 326 is provided as an opening/closing unit openable and closable to expose a conveying path to outside the image printing apparatus 301. A user opens the door 326 and thereby can remove a sheet remaining in the conveying path. Although FIG. 1 illustrates only the door 326 for exposing the conveying path to outside the image printing apparatus 301, a plurality of doors for exposing components (e.g., the photosensitive drum 309, the developing device 314, and the fixing device 318) within the image printing apparatus 301 to outside the image printing apparatus 301 is provided in the image printing apparatus 301.

This is the description of the configuration and the function of the image forming apparatus 100. Various rollers, such as the pickup rollers 3, 303, and 305 and the registration rollers 308, the photosensitive drum 309, the developing device 314, and the conveying belt 317 correspond to loads. The motor control device according to the present exemplary embodiment can be applied to motors for driving these loads.

<Control Configuration of Image Forming Apparatus>

Figure 2:
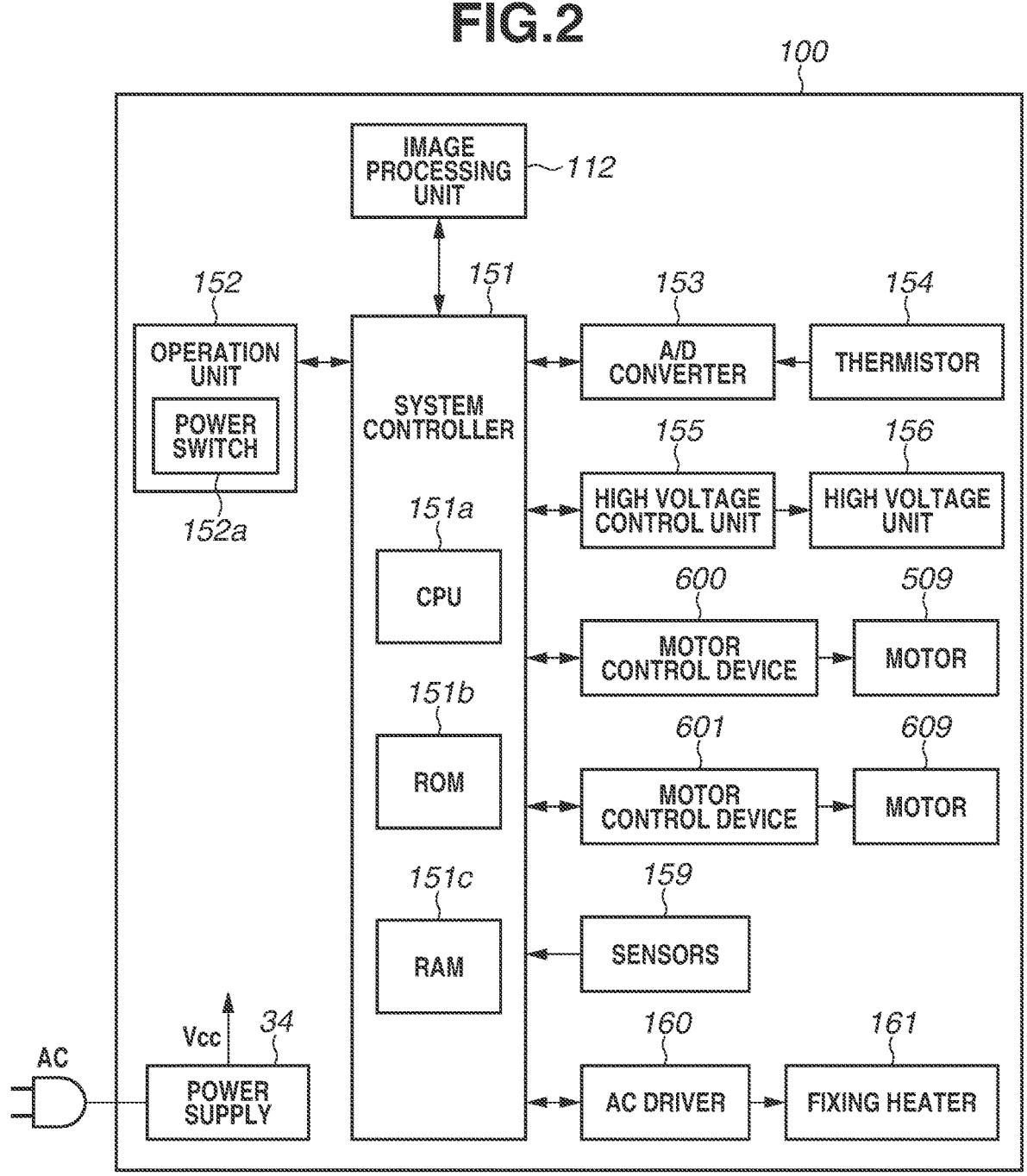
FIG. 2 is a block diagram illustrating a control configuration of the image forming apparatus.

FIG. 2 is a block diagram illustrating an example of the control configuration of the image forming apparatus 100. As illustrated in FIG. 2, a power supply 34 is included in the image forming apparatus 100. The power supply 34 is connected to an alternating-current power supply (commercial power supply) AC, and various devices within the image forming apparatus 100 operate with power output from the power supply 34.

As illustrated in FIG. 2, a system controller 151 includes a central processing unit (CPU) 151a, a read-only memory (ROM) 151b, and a random-access memory (RAM) 151c. The system controller 151 is connected to an image processing unit 112, an operation unit 152, an analog-to-digital (A/D) converter 153, a high voltage control unit 155, motor control devices 600 and 601, sensors 159, and an alternating current (AC) driver 160. The system controller 151 can transmit and receive data and a command to and from the units connected to the system controller 151.

The CPU 151a reads and executes various programs stored in the ROM 151b, thereby executing various sequences related to an image forming sequence determined in advance.

The RAM 151c is a storage device. The RAM 151c stores various types of data, such as a setting value for the high voltage control unit 155, an instruction value for the motor control device 600, and information received from the operation unit 152.

The system controller 151 transmits setting value data, required for image processing by the image processing unit 112, of the various devices provided within the image forming apparatus 100 to the image processing unit 112. Further, the system controller 151 receives signals from the sensors 159, and based on the received signals, sets a setting value of the high voltage control unit 155.

According to the setting value set by the system controller 151, the high voltage control unit 155 supplies a required voltage to a high voltage unit 156 (the charging device 310, the developing device 314, and the transfer charging device 315).

According to an instruction output from the CPU 151a, the motor control device 600 controls a motor 509 that drives a load provided in the image printing apparatus 301. According to an instruction output from the CPU 151a, the motor control device 601 controls a motor 609 that drives a load provided in the image printing apparatus 301. Although FIG. 2 illustrates two motors as motors for driving loads, three or more motors may be provided in the image forming apparatus 100. And a configuration may be employed in which a single motor control device controls a plurality of motors.

The A/D converter 153 receives a detected signal detected by a thermistor 154 that detects the temperature of a fixing heater 161. Then, the A/D converter 153 converts the detected signal from an analog signal to a digital signal and transmits the digital signal to the system controller 151. Based on the digital signal received from the A/D converter 153, the system controller 151 controls the AC driver 160. The AC driver 160 controls the fixing heater 161 so that the temperature of the fixing heater 161 becomes a temperature required to perform a fixing process. The fixing heater 161 is a heater for use in the fixing process and is included in the fixing device 318.

The system controller 151 controls the operation unit 152 to display, on a display unit provided in the operation unit 152, an operation screen for the user to set the type of a recording medium to be used (hereinafter referred to as the "paper type"). The system controller 151 receives information set by the user from the operation unit 152, and based on the information set by the user, controls the operation sequence of the image forming apparatus 100. The system controller 151 transmits, to the operation unit 152, information indicating the state of the image forming apparatus 100. The information indicating the state of the image forming apparatus 100 is, for example, information regarding the number of images to be formed, the progress state of an image forming operation, and a jam or multi-feed of a sheet in the image printing apparatus 301 and the document feeding apparatus 201. The operation unit 152 displays on the display unit the information received from the system controller 151.

As described above, the system controller 151 controls the operation sequence of the image forming apparatus 100.

{Turning On and Off of Power Supply of Image Forming Apparatus}

Figure 3:
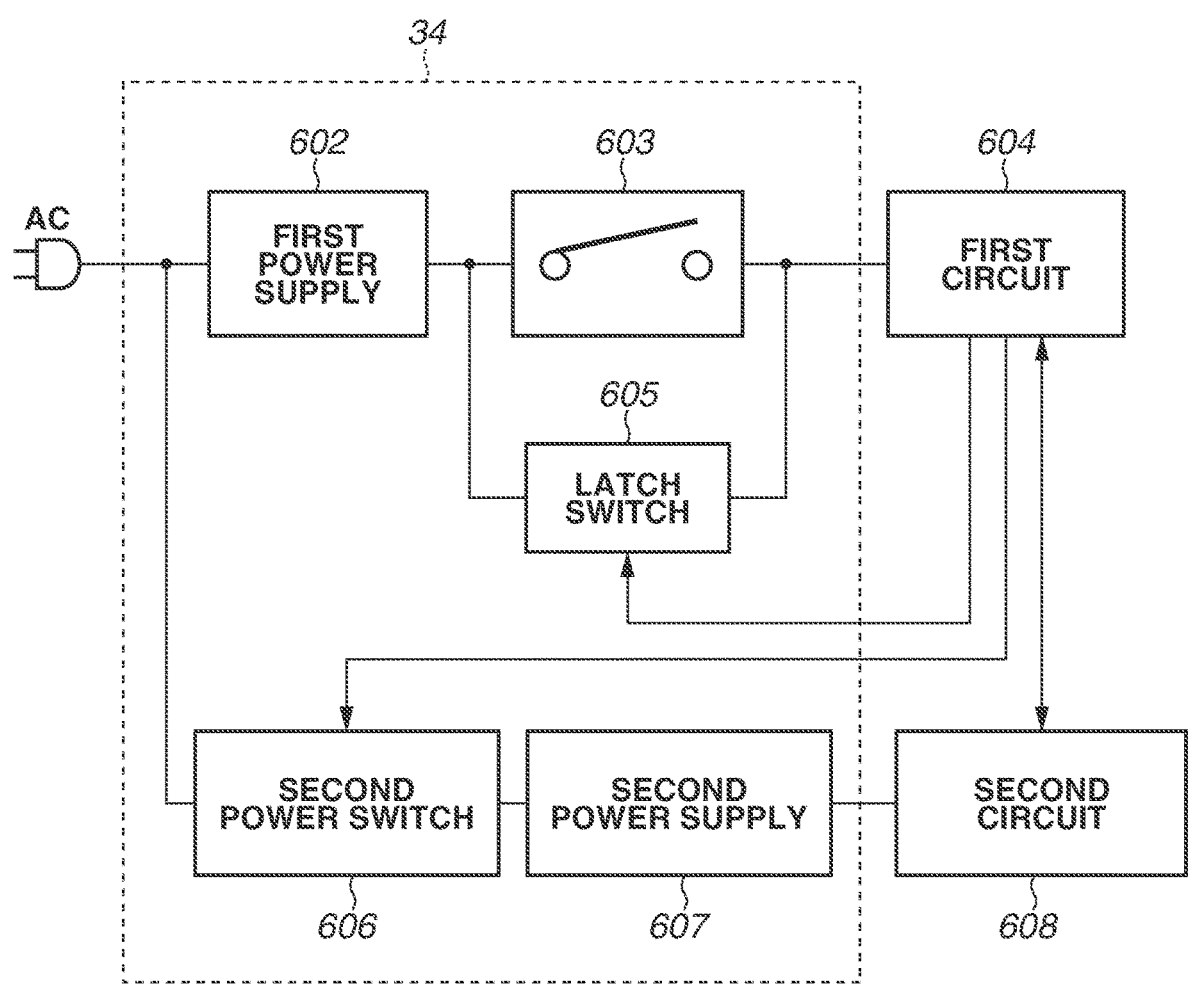
FIG. 3 is a block diagram illustrating a configuration of a power supply.

FIG. 3 is a block diagram illustrating the configuration of the power supply 34. As illustrated in FIG. 3, the power supply 34 includes a first power supply 602 to which power is supplied from the commercial power supply AC, and a main power switch (e.g., seesaw switch) 603 that is operated by the user. The power supply 34 also includes a latch switch 605, which is composed of a switching element, such as a field-effect transistor (FET), and of which the on and off states are controlled by a first circuit 604. Further, the power supply 34 includes a second power switch 606, which is composed of a switching element, such as an FET, and of which the on and off states are controlled by the first circuit 604, and a second power supply 607 as a power supply circuit to which power is supplied from the commercial power supply AC via the second power switch 606.

The first circuit 604 is a circuit that controls the state of the supply of power to various devices within the image forming apparatus 100, and is composed of, for example, a complex programmable logic device (CPLD). The CPU 151*a* and the operation unit 152 are included in the first circuit 604. The motor control devices 600 and 601 are included in a second circuit 608.

If the main power switch 603 is switched from an on state to an off state by the user, a path for supplying power from the first power supply 602 to the first circuit 604 is disconnected. If the main power switch 603 is switched from the on state to the off state by the user, the first circuit 604 brings the second power switch 606 into an off state. As a result, the supply of power from the commercial power supply AC to the second power supply 607 is disconnected, and the supply of power to the second circuit 608 is stopped. If the main power switch 603 is switched from the on state to the off state by the user, the first circuit 604 brings the second circuit 608 into an off state. Then, the first circuit 604 switches the latch switch 605 to an off state and brings the first circuit 604 itself into an off state.

As described above, if the main power switch 603 is switched from the on state to the off state by the user, the supply of power from the commercial power supply AC to the circuits other than the first power supply 602 is stopped (the power supply of the image forming apparatus 100 is turned off).

If the main power switch 603 is switched from the off state to the on state by the user, the supply of power from the first power supply 602 to the first circuit 604 is started, and the first circuit 604 (the CPU 151*a* and the operation unit 152) starts.

The first circuit 604 switches the latch switch 605 to an on state and latches the state of the supply of power to the first circuit 604 itself. As a result, even if the main power switch 603 is switched from the on state to the off state by the user, the supply of power from the first power supply 602 to the first circuit 604 is maintained via the latch switch 605. Further, the first circuit 604 brings the second power switch 606 into an on state. This results in the state where power is supplied from the commercial power supply AC to the second power supply 607 and the second circuit 608 (the motor control devices 600 and 601).

[Motor Control Device]

Next, the motor control device 600 according to the present exemplary embodiment is described. The motor control device 600 according to the present exemplary embodiment controls the motor 509 using vector control. In the present exemplary embodiment, as the motor 509, a motor A or a motor B of a different type from the motor A can be attached to the image forming apparatus 100. In the following description, a configuration is described in which as the motor 509, the motor A is connected to the motor control device 600. The configuration of the motor control device 601 is similar to the configuration of the motor control device 600, and therefore is not described.

<Vector Control>

Figure 4:
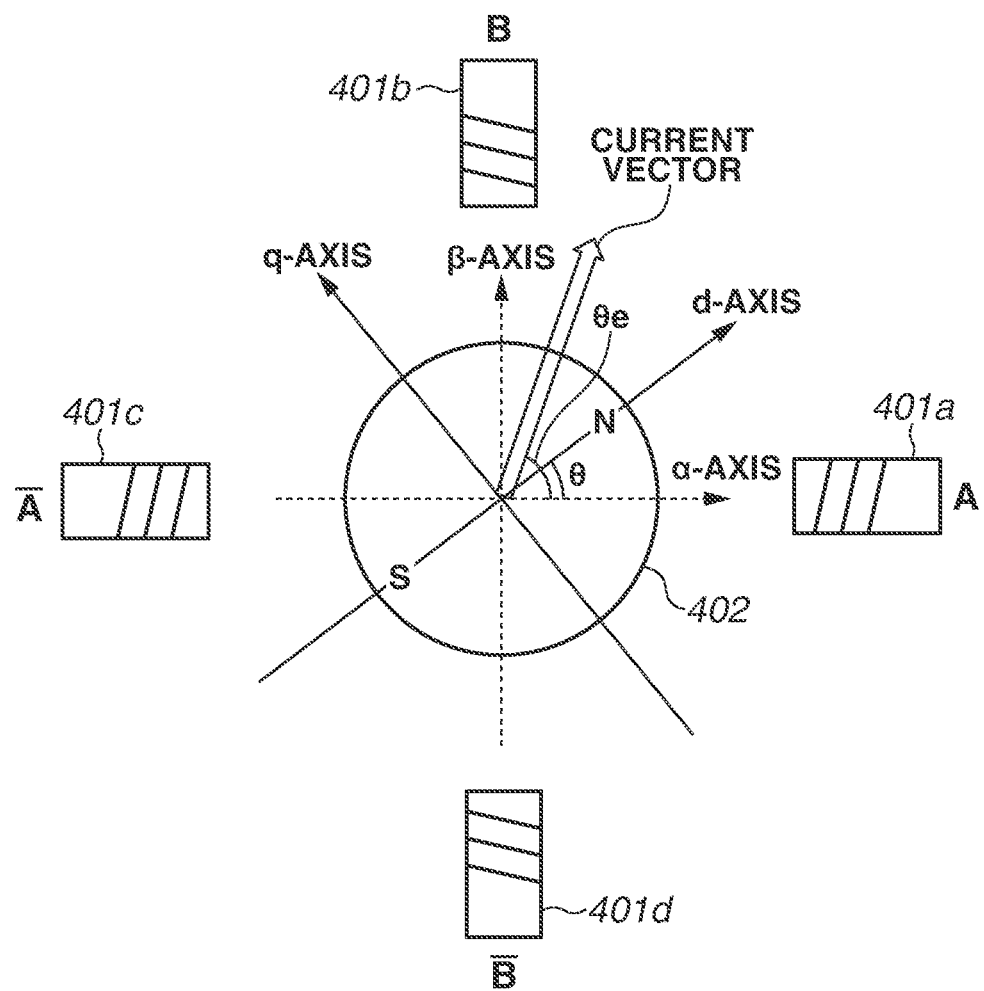
FIG. 4 is a diagram illustrating a relationship between a two-phase motor including an A-phase and a B-phase, and a d-axis and a q-axis in a rotating coordinate system.
Figure 5:
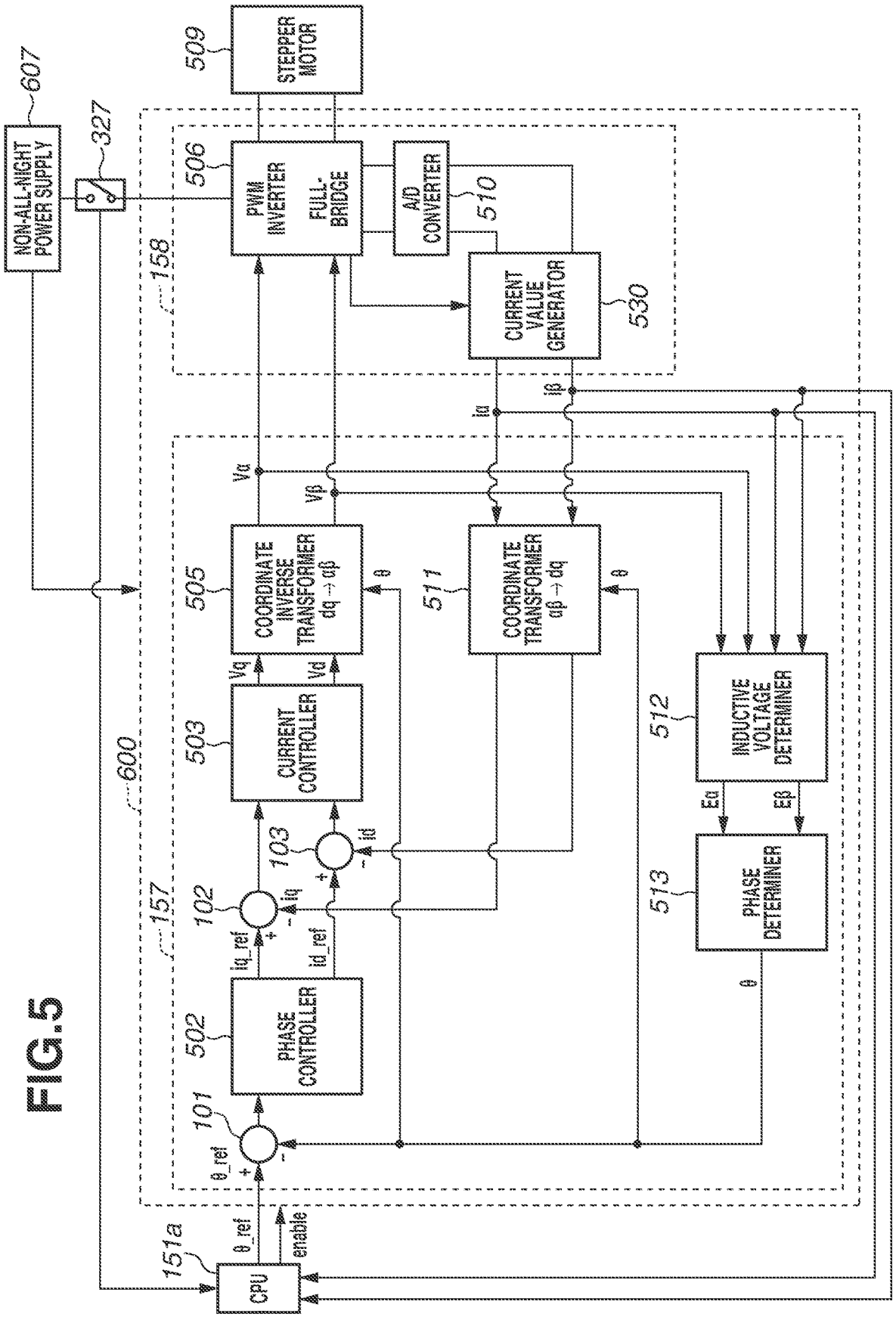
FIG. 5 is a block diagram illustrating a configuration of a motor control device.

First, with reference to FIGS. 4 and 5, a description is given of a method in which the motor control device 600 performs vector control, according to the present exemplary embodiment. In a motor in the following description, a sensor, such as a rotary encoder, for detecting the rotational phase of a rotor of the motor is not provided. Alternatively, a configuration may be employed in which a sensor, such as a rotary encoder, is provided in the motor.

FIG. 4 is a diagram illustrating the relationship between the stepper motor (hereinafter referred to as "motor") 509 that has two phases including an A-phase (a first phase) and a B-phase (a second phase), and a rotating coordinate system represented by a d-axis and a q-axis. In FIG. 4, in a stationary coordinate system, an α-axis, which is an axis corresponding to coils in the A-phase, and a β-axis, which is an axis corresponding to coils in the B-phase, are defined. In FIG. 4, the d-axis is defined along the direction of a magnetic flux created by the magnetic poles of a permanent magnet used in a rotor 402, and the q-axis is defined along a direction rotated 90 degrees counterclockwise from the d-axis (a direction orthogonal to the d-axis). The angle between the α-axis and the d-axis is defined as θ, and the rotational phase of the rotor 402 is represented by the angle θ. In the vector control, a rotating coordinate system based on the rotational phase θ of the rotor 402 is used. Specifically, in the vector control, a q-axis component (a torque current component) and a d-axis component (an excitation current component), which are current components in the rotating coordinate system of a current vector corresponding to a driving current flowing through each coil, are used. The q-axis component (the torque current component) generates a torque in the rotor 402, and the d-axis component (the excitation current component) influences the strength of a magnetic flux passing through the coil.

The vector control is a control method for controlling a motor by performing phase feedback control for controlling the value of a torque current component and the value of an excitation current component so that the deviation between an instruction phase indicating a target phase of a rotor and an actual rotational phase of the rotor becomes small. There is also a method for controlling a motor by performing velocity feedback control for controlling the value of a torque current component and the value of an excitation current component so that the deviation between an instruction velocity indicating a target velocity of a rotor and an actual rotational velocity of the rotor becomes small.

FIG. 5 is a block diagram illustrating an example of the configuration of the motor control device 600 that controls the motor 509. The motor control device 600 according to the present exemplary embodiment includes a motor control unit 157 that controls the motor 509 using the vector control, and a motor driving unit 158 that drives the motor 509 by supplying a driving current to each coil of the motor 509. The motor control device 600 includes at least one application-specific integrated circuit (ASIC) and executes functions described below.

The motor control unit 157 includes, as a circuit for performing the vector control, a phase controller 502, a current controller 503, a coordinate inverse transformer 505, and a coordinate transformer 511. The coordinate transformer 511 performs coordinate transformation on a current vector corresponding to a driving current flowing through each of the coils in the A-phase and the B-phase of the motor 509, from the stationary coordinate system represented by the α-axis and the β-axis to the rotating coordinate system represented by the q-axis and the d-axis. As a result, the driving currents flowing through the coils are represented by the current value of the q-axis component (a q-axis current) and the current value of the d-axis component (a d-axis current), which are current values in the rotating coordinate system. The q-axis current corresponds to a torque current that generates a torque in the rotor 402 of the motor 509. The d-axis current corresponds to an excitation current that influences the strength of a magnetic flux passing through each coil of the motor 509. The motor control device 600 can independently control the q-axis current and the d-axis current. As a result, the motor control unit 157 controls the q-axis current according to a load torque applied to the rotor 402 and thereby can efficiently generate a torque required for the rotation of the rotor 402. That is, in the vector control, the magnitude of the current vector illustrated in FIG. 4 changes according to the load torque applied to the rotor 402.

The motor control unit 157 determines the rotational phase θ of the rotor 402 of the motor 509 using a method described below, and based on the determination result, performs the vector control. The CPU 151a generates an instruction phase θ_ref indicating a target phase of the rotor 402 of the motor 509. Then, the CPU 151a outputs the instruction phase θ_ref to the motor control device 600. Actually, the CPU 151a outputs a pulse signal to the motor control device 600. The number of pulses corresponds to an instruction phase, and the frequency of pulses corresponds to a target velocity. The instruction phase θ_ref is generated based on, for example, a target velocity of the motor 509.

A subtractor 101 calculates the deviation between the rotational phase θ of the rotor 402 of the motor 509 and the instruction phase θ_ref and outputs the calculated deviation to the phase controller 502.

The phase controller 502 acquires the deviation output from the subtractor 101 in a predetermined time period T (e.g., 200 µs). Based on proportional control (P), integral control (I), and derivative control (D), the phase controller 502 generates a q-axis current instruction value iq_ref and a d-axis current instruction value id_ref as target values so that the deviation output from the subtractor 101 becomes small. Then, the phase controller 502 outputs the q-axis current instruction value iq_ref and the d-axis current instruction value id_ref. Specifically, based on the P-control, the I-control, and the D-control, the phase controller 502 generates the q-axis current instruction value iq_ref and the d-axis current instruction value id_ref so that the deviation output from the subtractor 101 becomes 0. Then, the phase controller 502 outputs the q-axis current instruction value iq_ref and the d-axis current instruction value id_ref. That is, the phase controller 502 functions as a first setting unit. The P-control is a control method for controlling the value of a target to be controlled, based on a value proportional to the deviation between an instruction value and an estimated value. The I-control is a control method for controlling the value of the target to be controlled, based on a value proportional to the time integral of the deviation between the instruction value and the estimated value. The D-control is a control method for controlling the value of the target to be controlled, based on a value proportional to a change over time in the deviation between the instruction value and the estimated value. The phase controller 502 according to the present exemplary embodiment generates the q-axis current instruction value iq_ref and the d-axis current instruction value id_ref based on proportional-integral-derivative (PID) control. The present disclosure, however, is not limited to this. For example, the phase controller 502 may generate the q-axis current instruction value iq_ref and the d-axis current instruction value id_ref based on proportional-integral (PI) control. In the present exemplary embodiment, the d-axis current instruction value id_ref, which influences the strength of the magnetic flux passing through each coil, is set to 0. The present disclosure, however, is not limited to this.

Driving currents flowing through the coils in the A-phase and the B-phase of the motor 509 are detected by the motor driving unit 158 using a method described below. The current values of the driving currents detected by the motor driving unit 158 are represented as current values iα and iβ in the stationary coordinate system by the following formulas, using a phase θe of the current vector illustrated in FIG. 4. The phase θe of the current vector is defined as the angle between the α-axis and the current vector. I represents the magnitude of the current vector.

$$i\alpha = I^* \cos \theta e \tag{1}$$

$$i\beta = I^* \sin \theta e \tag{2}$$

The current values iα and iβ are input to the coordinate transformer 511 and an inductive voltage determiner 512.

The coordinate transformer 511 transforms the current values iα and iβ in the stationary coordinate system into a current value iq of the q-axis current and a current value id of the d-axis current in the rotating coordinate system by the following formulas.

$$id = \cos \theta^* i\alpha + \sin \theta^* i\beta \tag{3}$$

$$iq = -\sin \theta^* i\alpha + \cos \theta^* i\beta \tag{4}$$

To a subtractor 102, the q-axis current instruction value iq_ref output from the phase controller 502 and the current value iq output from the coordinate transformer 511 are input. The subtractor 102 calculates the deviation between the q-axis current instruction value iq_ref and the current value iq and outputs the calculated deviation to the current controller 503.

To a subtractor 103, the d-axis current instruction value id_ref output from the phase controller 502 and the current value id output from the coordinate transformer 511 are input. The subtractor 103 calculates the deviation between the d-axis current instruction value id_ref and the current value id and outputs the calculated deviation to the current controller 503.

Based on the PID control, the current controller 503 generates driving voltages Vq and Vd so that each of the deviations input to the current controller 503 becomes small. Specifically, the current controller 503 generates the driving voltages Vq and Vd so that each of the deviations input to the current controller 503 becomes 0. Then, the current controller 503 outputs the driving voltages Vq and Vd to the coordinate inverse transformer 505. The current controller 503 according to the present exemplary embodiment generates the driving voltages Vq and Vd based on the PID control. The present disclosure, however, is not limited to this. For example, the current controller 503 may generate the driving voltages Vq and Vd based on the PI control.

The coordinate inverse transformer 505 inversely transforms the driving voltages Vq and Vd in the rotating coordinate system, which are output from the current controller 503, into driving voltages Vα and Vβ in the stationary coordinate system by the following formulas.

$$V\alpha = \cos \theta^* Vd - \sin \theta^* Vq \tag{5}$$

$$V\beta = \sin \theta^* Vd + \cos \theta^* Vq \tag{6}$$

The coordinate inverse transformer 505 outputs the inversely transformed driving voltages Vα and Vβ to the inductive voltage determiner 512 and a pulse-width modulation (PWM) inverter 506.

The PWM inverter 506 includes a full-bridge circuit. The full-bridge circuit is driven by PWM signals based on the driving voltages Vα and Vβ input from the coordinate inverse transformer 505. As a result, the PWM inverter 506 generates the driving currents iα and iβ according to the driving voltages Vα and Vβ and supplies the driving currents iα and iβ to the coils of the motor 509, thereby driving the motor 509. In the present exemplary embodiment, the PWM inverter 506 includes a full-bridge circuit. Alternatively, the PWM inverter 506 may include a half-bridge circuit.

Next, a description is given of a method for determining the rotational phase θ. The rotational phase θ of the rotor 402 is determined using the values of inductive voltages Eα and Eβ induced in the coils in the A-phase and the B-phase of the motor 509 by the rotation of the rotor 402. The value of each inductive voltage is determined (calculated) by the inductive voltage determiner 512. Specifically, the inductive voltages Eα and Eβ are determined by the following formulas, based on the current values iα and iβ input from an A/D converter 510 to the inductive voltage determiner 512 and the driving voltages Vα and Vβ input from the coordinate inverse transformer 505 to the inductive voltage determiner 512.

$$E\alpha = V\alpha - R^* i\alpha - L^* di\alpha/dt \quad (7)$$

$$E\beta = V\beta - R^* i\beta - L^* di\beta/dt \quad (8)$$

In these formulas, R represents coil resistance, and L represents coil inductance. The values of the coil resistance R and the coil inductance L (hereinafter referred to as "control values") are values specific to the motor A as the motor 509 in use and are stored in advance in the ROM 151b. Control values regarding the motor B are also stored in advance in the ROM 151b. Based on the type of motor, the CPU 151a sets either of the control values regarding the motor A and the control values regarding the motor B as control values. The control values according to the present exemplary embodiment also include, for example, gain values used to determine the current instruction values, such as the q-axis current instruction value iq_ref (i.e., for the PID control).

The inductive voltages Eα and Eβ determined by the inductive voltage determiner 512 are output to a phase determiner 513.

Based on the ratio between the inductive voltages Eα and Eβ output from the inductive voltage determiner 512, the phase determiner 513 determines the rotational phase θ of the rotor 402 of the motor 509 by the following formula.

$$\theta = \tan^{-1}(-E\beta/E\alpha) \quad (9)$$

In the present exemplary embodiment, the phase determiner 513 determines the rotational phase θ by performing calculation based on formula (9). The present disclosure, however, is not limited to this. For example, the phase determiner 513 may determine the rotational phase θ by referencing a table stored in the ROM 151b and illustrating the relationships between the inductive voltages Eα and Eβ, and the rotational phase θ corresponding to the inductive voltages Eα and Eβ.

The rotational phase θ of the rotor 402 obtained as described above is input to the subtractor 101, the coordinate inverse transformer 505, and the coordinate transformer 511.

The motor control device 600 repeatedly performs the above control.

As described above, the motor control device 600 according to the present exemplary embodiment performs the vector control for controlling current values in the rotating coordinate system using the phase feedback control so that the deviation between the instruction phase θ_ref and the rotational phase θ becomes small. The vector control is performed, whereby it is possible to prevent a motor from entering a step-out state and prevent an increase in the motor sound and an increase in power consumption due to an excess torque. The phase feedback control is performed, thereby controlling the rotational phase of a rotor so that the rotational phase of the rotor becomes a desired phase. Thus, in an image forming apparatus, vector control using phase feedback control is applied to a motor for driving a load (e.g., a registration roller) for which the rotational phase of a rotor needs to be controlled with high accuracy, thereby appropriately forming an image on a recording medium.

<Motor Driving Unit>

As described above, in control of the driving of a motor, the current value of a driving current flowing through each coil is detected, and based on the detected current value, the driving current flowing through the coil is controlled. That is, in control of the driving of the motor, a configuration for detecting the current value of a driving current flowing through each coil, and a configuration for supplying the driving current to the coil are required.

Figure 6:
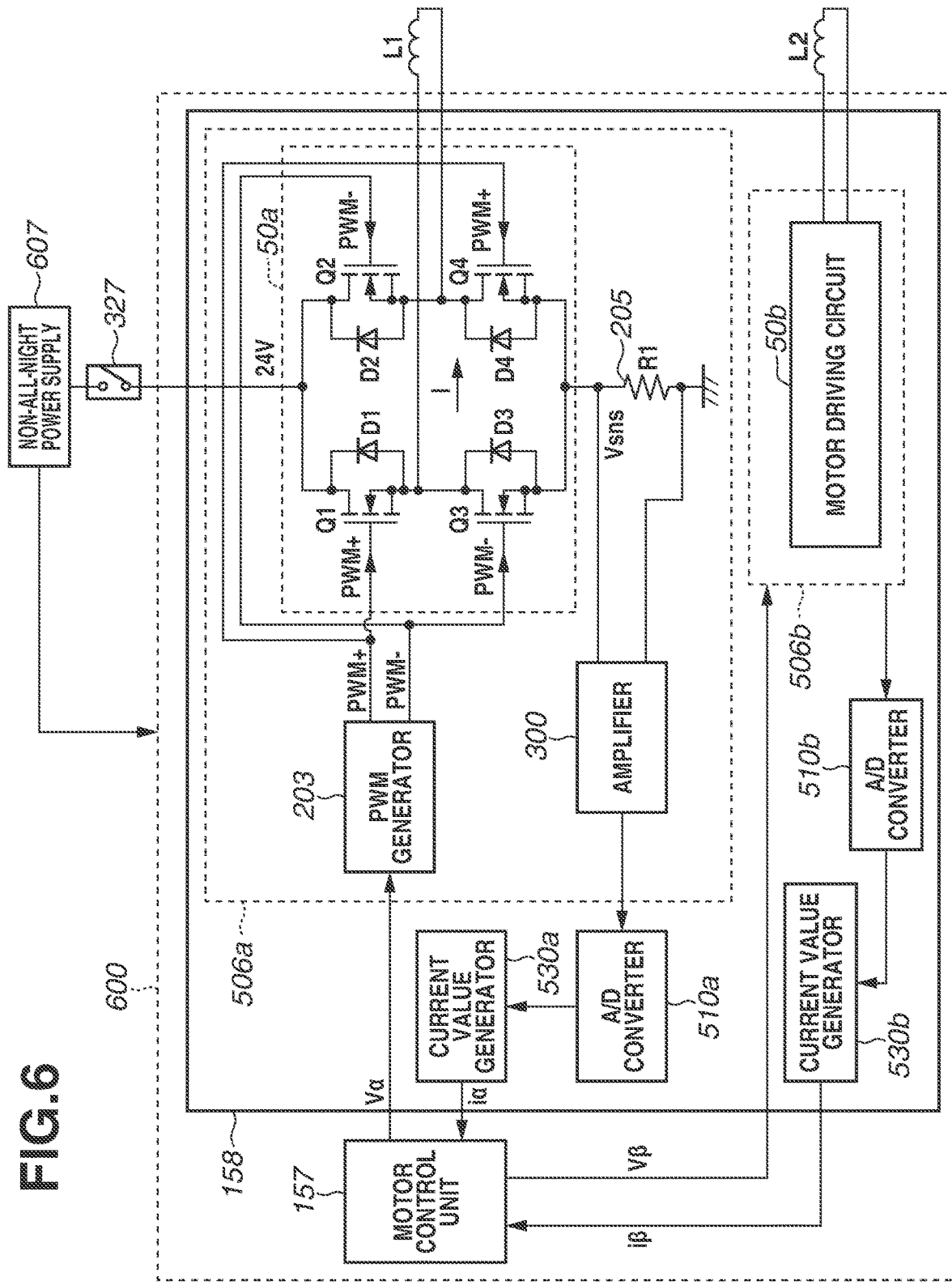
FIG. 6 is a diagram illustrating an example of a configuration of a motor driving unit.

FIG. 6 is a diagram illustrating an example of the configuration of the motor driving unit 158 according to the present exemplary embodiment. As illustrated in FIG. 6, the motor driving unit 158 includes a PWM inverter 506a, an A/D converter 510a, and a current value generator 530a in the A-phase. The motor driving unit 158 also includes a PWM inverter 506b, an A/D converter 510b, and a current value generator 530b in the B-phase. The PWM inverter 506 illustrated in FIG. 5 includes the PWM inverters 506a and 506b. The A/D converter 510 illustrated in FIG. 5 includes the A/D converters 510a and 510b. Further, a current value generator 530 illustrated in FIG. 5 includes the current value generators 530a and 530b. As described above, a PWM inverter, an A/D converter, and a current value generator are provided corresponding to each of the A-phase and the B-phase of the motor 509 and independently driven with respect to each phase. Since the configuration of the PWM inverter 506a and the configuration of the PWM inverter 506b are similar to each other, FIG. 6 illustrates the specific configuration of the PWM inverter 506a. The PWM inverter 506a includes a motor driving circuit 50a, a PWM generator 203 that generates PWM signals that control on operations and off operations of a plurality of FETs provided in the motor driving circuit 50a, and an amplifier 300 that amplifies voltage signals at both ends of a resistor 205.

As illustrated in FIG. 6, the motor driving circuit 50a includes FETs Q1 to Q4 as switching elements and a coil L1 of the motor 509. Specifically, the FETs Q1 to Q4 form an H-bridge circuit, and the coil L1 connects a connection point between the FETs Q1 and Q3 and a connection point between the FETs Q2 and Q4. The drain terminals of the FETs Q1 and Q2 are connected to a 24-V power supply terminal, and the source terminals of the FETs Q3 and Q4 are connected to one end of the resistor 205. Further, the other end of the resistor 205 is connected to the ground (GND). That is, the resistor 205 is grounded. In FIG. 6, the coil L1 is actually a coil provided in the motor 509. That is, the coil L1 is provided outside the motor control device 600.

The FETs Q1 and Q4 are driven by PWM+ as the PWM signal, and the FETs Q2 and Q3 are driven by PWM− as the PWM signal. PWM+ and PWM− have an antiphase relationship with each other. That is, if PWM+ is 'H (a high level)', PWM− is 'L (a low level)'. If PWM− is 'H', PWM+ is 'L'.

If PWM+ is 'H', a driving current flows through the power supply, the FET Q1, the coil L1, the FET Q4, and the GND in this order. Then, if PWM+ changes to 'L', an induced electromotive force is generated in the coil L1 in the direction of preventing a change in a current. As a result, a driving current flows through the GND, the FET Q3, the coil L1, the FET Q2, and the power supply in this order. If PWM+ is 'L', a driving current flows through the power supply, the FET Q2, the coil L1, the FET Q3, and the GND in this order. Then, if PWM+ changes to 'H', an induced electromotive force is generated in the coil L1 in the direction of preventing a change in a current. As a result, a driving current flows through the GND, the FET Q4, the coil L1, the FET Q1, and the power supply in this order.

{Method for Supplying Driving Current}

First, a description is given of a method in which the motor driving unit 158 supplies a driving current to each coil.

Figure 7:
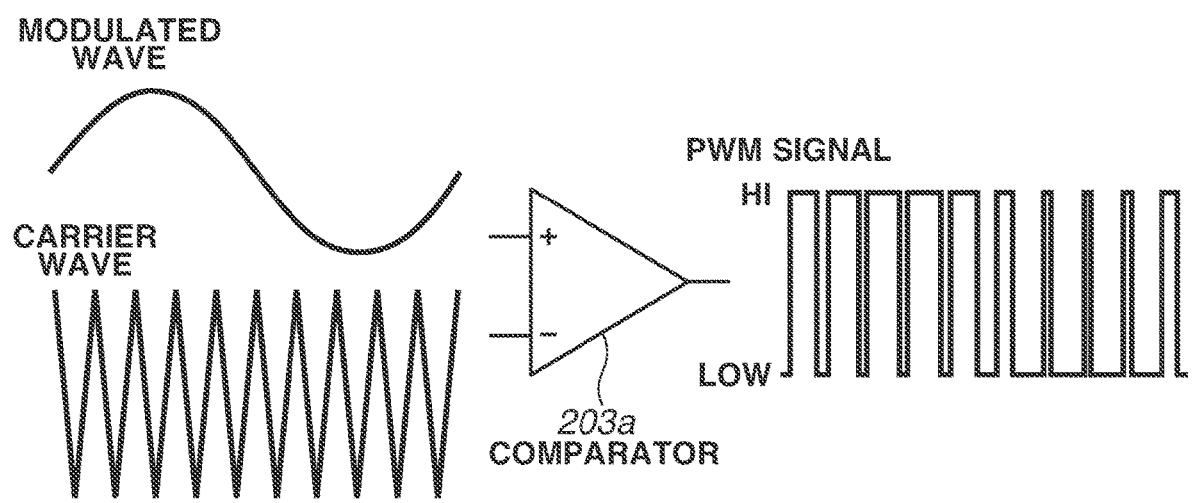
FIG. 7 is a diagram illustrating a configuration in which a pulse-width modulation (PWM) generator generates a PWM signal.

FIG. 7 is a diagram illustrating a configuration in which the PWM generator 203 according to the present exemplary embodiment generates the PWM signal. As illustrated in FIG. 7, the PWM generator 203 according to the present exemplary embodiment includes a comparator 203a that compares a modulated wave with a carrier wave. The PWM generator 203 compares the modulated wave with the carrier wave using the comparator 203a, thereby generating the PWM signal. In the present exemplary embodiment, the PWM generator 203 generates a triangular carrier wave with a predetermined frequency. In a case where the period from the timing when the value of the triangular carrier wave is a local minimum to the timing when the value of the triangular carrier wave is a local minimum next is one period, the waveform of the triangular carrier wave is a waveform line-symmetric with respect to the timing when the value of the triangular carrier wave is a local maximum in one period. A triangular carrier wave in the A-phase and a triangular carrier wave in the B-phase are synchronized with each other.

Figure 8:
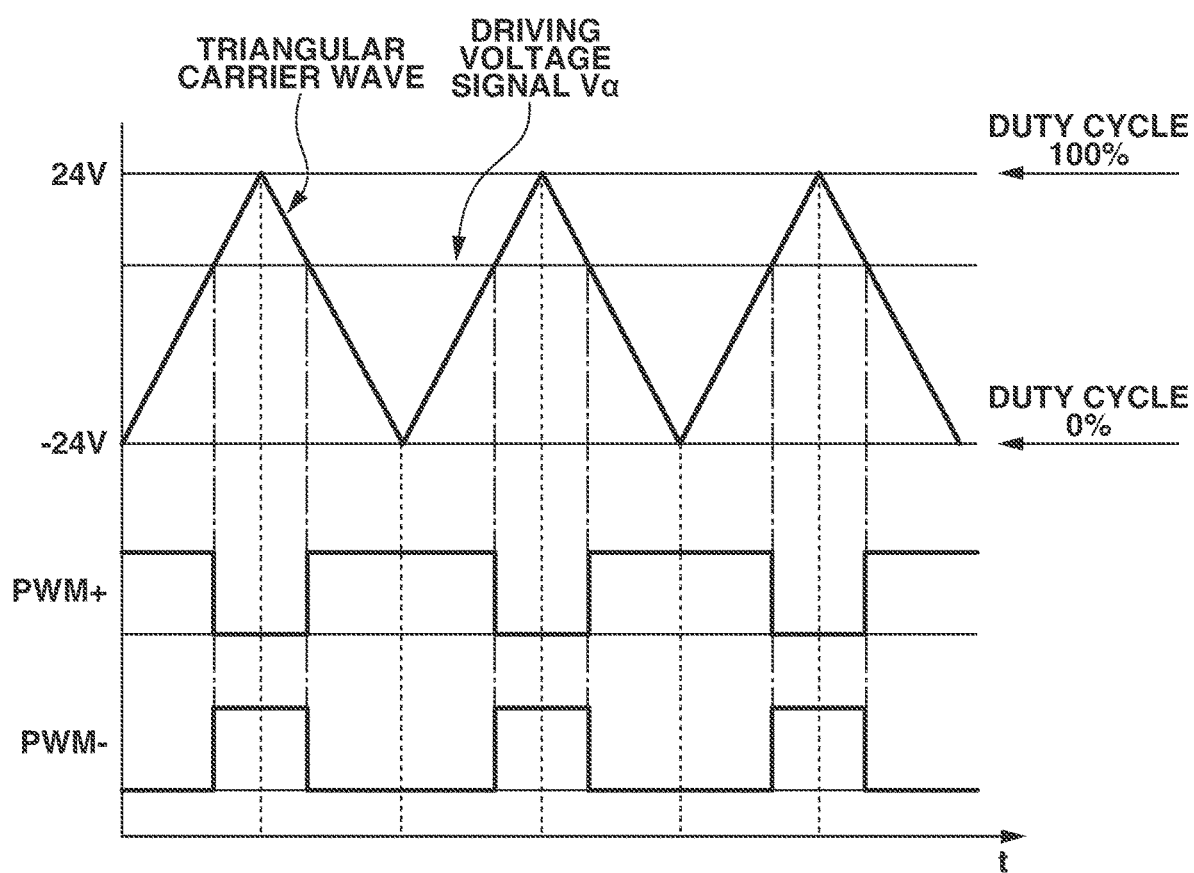
FIG. 8 is a diagram illustrating a method in which the PWM generator generates the PWM signal.

FIG. 8 is a diagram illustrating a method in which the PWM generator 203 generates the PWM signal. With reference to FIGS. 6 to 8, a description is given of the method in which the PWM generator 203 generates the PWM signal.

As illustrated in FIG. 6, the driving voltage Vα output from the motor control unit 157 is input to the PWM generator 203. The PWM generator 203 compares the driving voltage Vα as a modulated wave with a triangular carrier wave using the comparator 203a. In a period when the driving voltage Vα is greater than the triangular carrier wave (a high period), the PWM generator 203 generates PWM+ as 'H'. In a period when the driving voltage Vα is smaller than the triangular carrier wave (a low period), the PWM generator 203 generates PWM+ as 'L'. The PWM generator 203 generates PWM– by reversing the phase of PWM+.

As illustrated in FIG. 6, the PWM generator 203 outputs PWM+ to the FETs Q1 and Q4 and outputs PWM– to the FETs Q2 and Q3. The on operations and the off operations of the FETs Q1 to Q4 are controlled by PWM+ and PWM–. As a result, it is possible to control the magnitude and the direction of a driving current to be supplied to the coil L1 in the A-phase.

In the present exemplary embodiment, if a driving voltage is 24 V, a duty cycle corresponds to 100%. If the driving voltage is 0 V, the duty cycle corresponds to 50%. If the driving voltage is –24 V, the duty cycle corresponds to 0%. That is, in the present exemplary embodiment, the driving voltage Vα is a value corresponding to the duty cycle of PWM+. In the present exemplary embodiment, the ratio of the high period to the period of PWM+ is defined as the duty cycle. Alternatively, the ratio of the low period to the period of PWM+ may be defined as the duty cycle.

{Current Detection Method}

Next, a description is given of a method in which the motor driving unit 158 detects the current value of a driving current flowing through each coil.

As described above, a driving current flowing through the coil L1 is detected based on a voltage Vsns applied to the resistor 205. The amplifier 300 amplifies a signal of the voltage Vsns and outputs the amplified signal to the A/D converter 510a. The A/D converter 510a converts the voltage Vsns from an analog value to a digital value and outputs the digital value to the current value generator 530a.

The current value generator 530a samples the value output from the A/D converter 510a in a predetermined period and generates a current value based on the sampled value. The current value generator 530a outputs the generated current value as the current value iα.

<Method for Distinguishing Type of Motor>

Next, a description is given of a method for distinguishing the type of motor attached to the motor control device 600.

Figure 9:
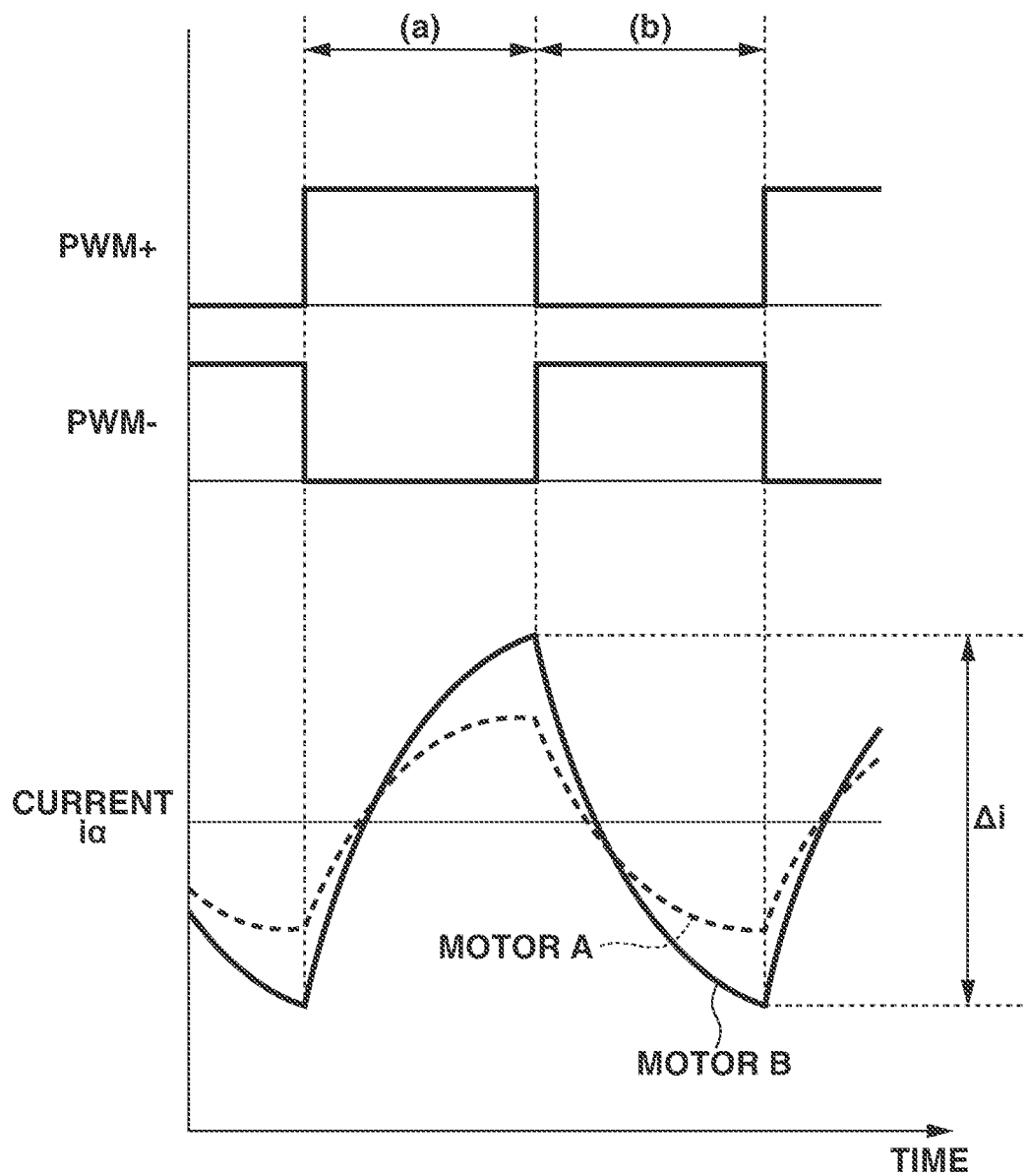
FIG. 9 is a diagram illustrating a current $i\alpha$ in a case where a duty cycle of PWM+ is 50%.

FIG. 9 is a diagram illustrating the current iα in a case where the duty cycle of PWM+ is 50%. As illustrated in FIG. 9, in a case where the duty cycle of PWM+ is 50%, the maximum value and the minimum value of the current iα flowing through each coil of the motor A are values different from the maximum value and the minimum value of the current iα flowing through each coil of the motor B. This is because the resistance value R and the inductance value L of the coil of the motor A are values different from the resistance value R and the inductance value L of the coil of the motor B.

In the present exemplary embodiment, in the state where a voltage is applied to each coil in the A-phase based on the PWM signal of which the duty cycle is set to a predetermined value (e.g., 50%), then based on a current flowing through the coil in the A-phase, the type of motor connected to the motor control device 600 is distinguished.

As illustrated in FIG. 5, the current values iα and iβ generated by the current value generator 530 are output to the CPU 151a. Based on the local maximum (the maximum value) of the current value iα in the period from the timing when the current value iα is a local minimum first after the current value iα is input to the timing when the current value iα is a local minimum next, the CPU 151a distinguishes the type of motor connected to the motor control device 600. Specifically, if the local maximum of the current value iα in the above period is greater than or equal to a threshold ith, the CPU 151a determines that the motor 509 connected to the motor control device 600 is the motor B. Then, the CPU 151a sets the control values to the values corresponding to the motor B. If the local maximum of the current value iα in the above period is less than the threshold ith, the CPU 151a determines that the motor 509 connected to the motor control device 600 is the motor A. Then, the CPU 151a sets the control values to the values corresponding to the motor A. The threshold ith is set to a value greater than the local maximum of a current flowing through each coil of the motor A in the state where a voltage is applied to the coil based on the PWM signal of which the duty cycle is set to the predetermined value. Further, the threshold ith is set to a value smaller than the local maximum of a current flowing through each coil of the motor B in the state where a voltage is applied to the coil based on the PWM signal of which the duty cycle is set to the predetermined value. That is, the local maximum of the current value iα being less than the threshold ith means that the motor 509 attached to the motor control device 600 is the motor A. The local maximum of the current value iα being greater than the threshold ith means that the motor 509 attached to the motor control device 600 is the motor B.

In the present exemplary embodiment, based on the local maximum (the maximum value) of the current value iα, the type of motor connected to the motor control device 600 is distinguished. The present disclosure, however, is not limited to this. Alternatively, for example, based on the local minimum (the minimum value) of the current value iα, the type of motor connected to the motor control device 600 may be distinguished. Yet alternatively, for example, based on the difference value between the local maximum (the maximum value) and the local minimum (the minimum value) of the current value iα, the type of motor connected to the motor control device 600 may be distinguished.

Figure 10:
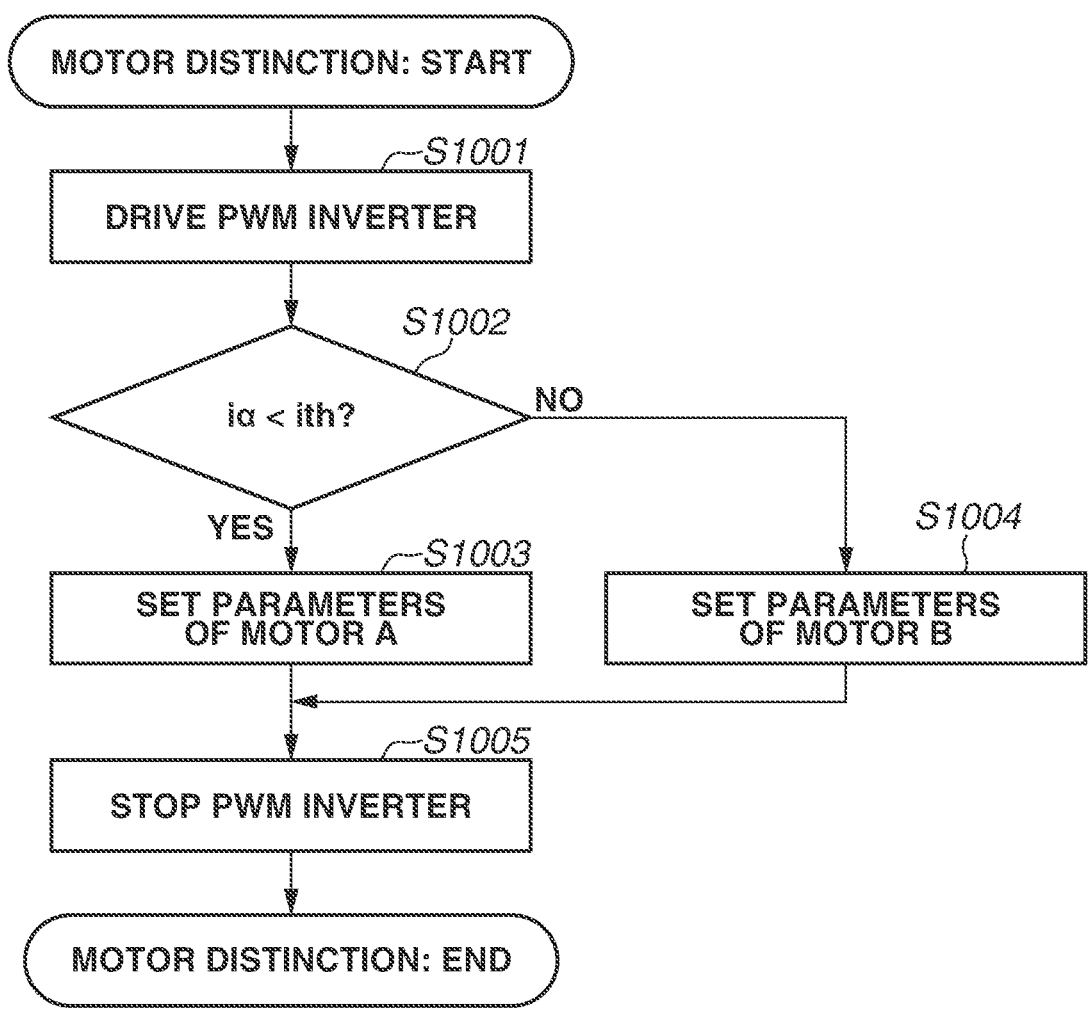
FIG. 10 is a flowchart illustrating a method for distinguishing a type of motor.

FIG. 10 is a flowchart illustrating the method for distinguishing the type of motor. The processing of the flowchart is executed by the CPU 151a.

In step S1001, the CPU 151a drives the PWM inverter 506 (the motor driving unit 158). Specifically, the CPU 151a sets the duty cycle of PWM+ to the predetermined value and applies a voltage to each coil of the motor 509.

If the current value iα is less than the threshold ith in step S1002 (YES in step S1002), then in step S1003, the CPU 151a determines that the motor 509 connected to the motor control device 600 is the motor A. Then, the CPU 151a sets the control values in the motor control device 600 to the control values corresponding to the motor A.

If, on the other hand, the current value iα is greater than or equal to the threshold ith in step S1002 (NO in step S1002), then in step S1004, the CPU 151a determines that the motor 509 connected to the motor control device 600 is the motor B. Then, the CPU 151a sets the control values in the motor control device 600 to the control values corresponding to the motor B.

In step S1005, the CPU 151a stops driving the PWM inverter 506 (the motor driving unit 158), and the processing of the flowchart ends.

<Timing When Process of Distinguishing Type of Motor is Started>

Next, a description is given of the timing when the process of distinguishing the type of motor (hereinafter referred to as a "distinction process") is started. In the present exemplary embodiment, the application of the following configuration prevents the type of motor from being erroneously distinguished. In the following description, the distinction process includes the supply of a current to a motor, the detection of the current flowing through each coil of the motor, and the distinction of the type of motor based on the detection result.

{Interlock Switch}

As illustrated in FIGS. 1, 5, and 6, in the image forming apparatus 100 according to the present exemplary embodiment, an interlock switch 327 is provided so that power from the second power supply 607 is not supplied to the H-bridge circuit within the PWM inverter 506 in the state where the door 326 is opened. In the state where the door 326 is opened, the interlock switch 327 is in a disconnected state where the second power supply 607 is disconnected from the H-bridge circuit. As a result, power from the second power supply 607 is not supplied to the H-bridge circuit. On the other hand, in the state where the door 326 is closed, the interlock switch 327 is in a connected state where the second power supply 607 and the H-bridge circuit are connected together. As a result, power from the second power supply 607 is supplied to the H-bridge circuit. With such a configuration, the user can safely access the inside of the image forming apparatus 100. Although FIG. 1 illustrates only the interlock switch 327 corresponding to the door 326, actually, an interlock switch is provided in each of doors provided in the image forming apparatus 100.

In the present exemplary embodiment, in the state where a door (not illustrated) different from the door 326 is opened, an interlock switch corresponding to the door is disconnected, and power from the second power supply 607 is not supplied to a bridge circuit to which the motor 609 is connected. In the state where the door is closed, the interlock switch corresponding to the door is connected, and power from the second power supply 607 is supplied to the bridge circuit to which the motor 609 is connected. However, the configuration of the supply of power to the bridge circuit to which the motor 609 is connected is not limited to this. For example, a configuration may be employed in which in the state where the door 326 is opened, the interlock switch 327 is disconnected, and power from the second power supply 607 is not supplied to the bridge circuit to which the motor 609 is connected. Further, in the state where the door 326 is closed, the interlock switch 327 is connected, and power from the second power supply 607 is supplied to the bridge circuit to which the motor 609 is connected.

As illustrated in FIGS. 5 and 6, power from the second power supply 607 is also supplied to the motor control devices 600 and 601. In the present exemplary embodiment, regardless of the opened and closed states of the door 326, power is supplied from the second power supply 607 to the motor control devices 600 and 601. Even if the door 326 is in an opened state, the motor control devices 600 and 601 can operate (the functions of the motor control devices 600 and 601 are executed).

The CPU 151a determines whether the interlock switch 327 is on (i.e., the door 326 is in a closed state).

{Timing when Distinction process is Started}

Figure 11:
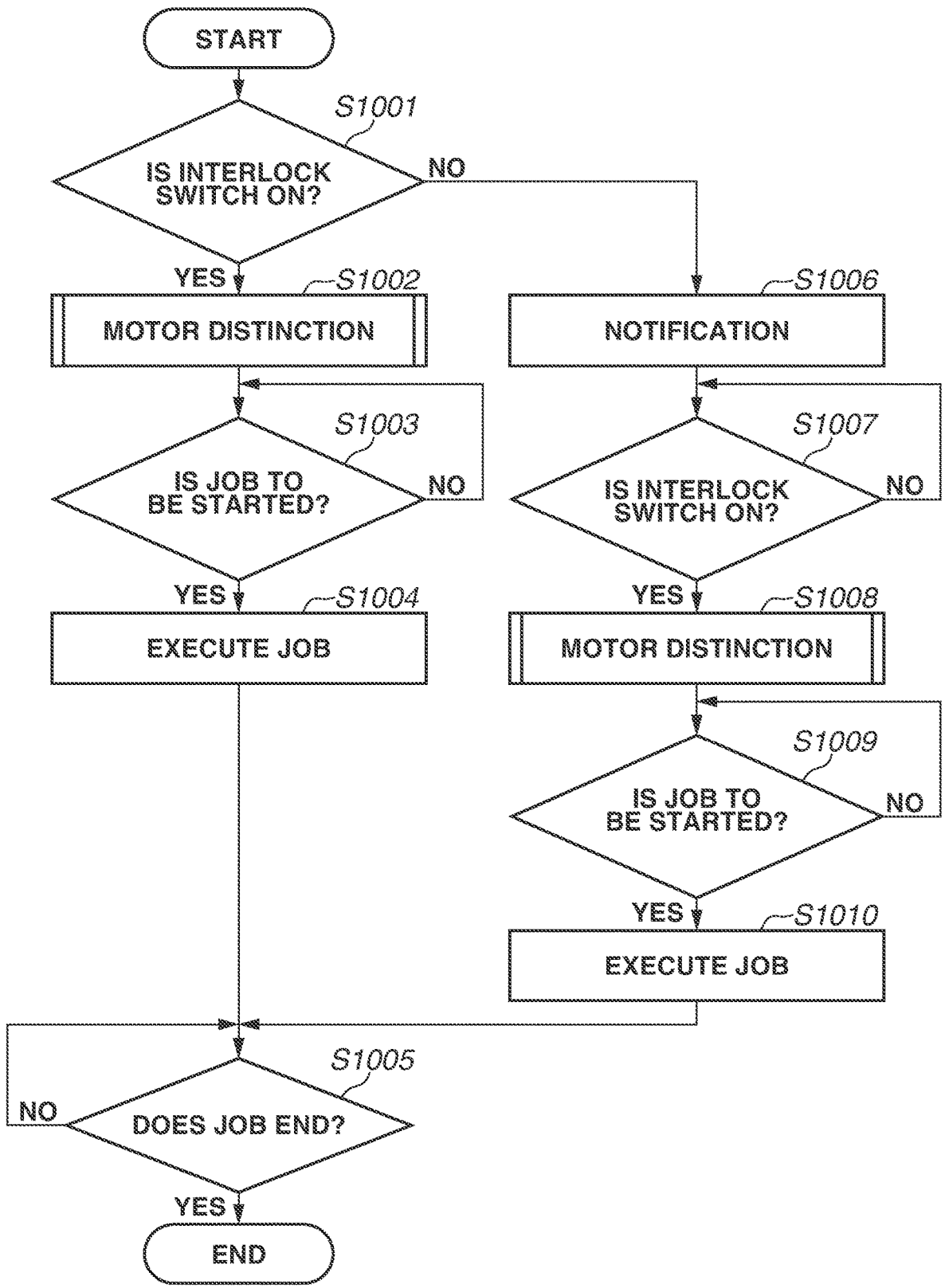
FIG. 11 is a flowchart illustrating a method for starting a distinction process according to the first exemplary embodiment.

FIG. 11 is a flowchart illustrating a method for starting the distinction process. The processing of the flowchart is executed by the CPU 151a if the main power switch 603 switches from an off state to an on state.

If the main power switch 603 switches from the off state to the on state, then in step S1001, the CPU 151a determines whether the interlock switch 327 is in an on state.

If the interlock switch 327 is in the on state in step S1001 (YES in step S1001), then in step S1002, the CPU 151a starts the distinction process by the method described with reference to FIG. 10. At this time, the CPU 151a starts the distinction process also regarding the motor 609.

Next, if an instruction to start a print job is input from, for example, the operation unit 152 in step S1003 (YES in step S1003), then in step S1004, the CPU 151a starts the print job using the image forming apparatus 100.

Then, if the print job ends in step S1005 (YES in step S1005), the processing of the flowchart ends.

If, on the other hand, the interlock switch 327 is in an off state in step S1001 (NO in step S1001), then in step S1006, the CPU 151a displays, on the display unit provided in the operation unit 152, a notification urging the user to close the door 326.

If the interlock switch 327 is in the on state in step S1007 (YES in step S1007), then in step S1008, the CPU 151a starts the distinction process by the method described with reference to FIG. 10. At this time, the CPU 151a starts the distinction process also regarding the motor 609.

Then, if an instruction to start a print job is input from, for example, the operation unit 152 in step S1009 (YES in step S1009), then in step S1010, the CPU 151a starts the print job using the image forming apparatus 100, and the processing proceeds to step S1005.

If the print job ends in step S1005 (YES in step S1005), the processing of the flowchart ends.

As described above, in the present exemplary embodiment, if the main power switch 603 switches from an off state to an on state, the CPU 151a determines whether the interlock switch 327 is in an on state. In a case where the interlock switch 327 is in the on state, the CPU 151a starts the distinction process regarding the motor 509. On the other hand, in a case where the interlock switch 327 is in an off state, and if the interlock switch 327 switches from the off state to the on state, the CPU 151a starts the distinction process regarding the motor 509. That is, in a case where the interlock switch 327 is in the on state, the CPU 151a executes the distinction process regarding the motor 509. As a result, it is possible to prevent the distinction process from being executed in the state where a current is not supplied to a motor due to the state where an interlock switch is disconnected. That is, it is possible to prevent the type of motor from being erroneously distinguished.

In a case where the interlock switch 327 is in the off state (even if an interlock switch corresponding to the motor 609 is in an on state), the CPU 151a does not execute the distinction process regarding the motor 609.

In the present exemplary embodiment, the distinction process is executed not every time a print job is executed, but using as a trigger the fact that the main power switch 603 switches from the off state to the on state. That is, in the present exemplary embodiment, if there is a possibility that a motor is replaced, the distinction process is executed. As a result, it is possible to prevent the productivity of the image forming apparatus from decreasing due to the fact that the distinction process is executed every time a print job is executed.

In the present exemplary embodiment, the distinction process is executed before a print job is started. As a result, it is possible to prevent the situation where the motor A is controlled in the state where the control values corresponding to the motor B of a different type from the motor A connected to the motor control device 600 are set, and control of the motor A becomes unstable.

In the present exemplary embodiment, in a case where the interlock switch 327 is in the off state (even if the interlock switch corresponding to the motor 609 is in the on state), the CPU 151a does not execute the distinction process regarding the motor 609. The present disclosure, however, is not limited to this. For example, a configuration may be employed in which in a case where the interlock switch 327 is in the off state, and the interlock switch corresponding to the motor 609 is in the on state, the distinction process regarding the motor 509 is not executed, and the distinction process regarding the motor 609 is executed. That is, it is only necessary to employ a configuration in which the distinction process regarding a motor corresponding to an interlock switch in an off state is not executed. As a result, it is possible to prevent the distinction process from being executed in the state where a current is not supplied to a motor due to the state where an interlock switch is disconnected. That is, it is possible to prevent the type of motor from being erroneously distinguished.

In the present exemplary embodiment, in a case where the interlock switch 327 is in the off state, the distinction process is not executed. The present disclosure, however, is not limited to this. That is, in a case where the interlock switch 327 is in the off state, the distinction process may be executed. If it is detected that the interlock switch 327 is in the off state during the period when the distinction process is executed, the executed distinction process is retried. That is, if it is detected that the interlock switch 327 is in the off state during the period when the distinction process is executed, the distinction result of the executed distinction process is not used to set the control values. The result of the distinction process executed during the period when the interlock switch 327 is in the on state is used to set the control values. As a result, it is possible to prevent the distinction process from being executed in the state where a current is not supplied to a motor due to the state where an interlock switch is disconnected. That is, it is possible to prevent the type of motor from being erroneously distinguished.

In the present exemplary embodiment, in a case where the interlock switch 327 is in the off state when the main power switch 603 switches from the off state to the on state, and if the interlock switch 327 switches from the off state to the on state, the distinction process is executed. The present disclosure, however, is not limited to this. For example, in a case where the interlock switch 327 is in the off state when the main power switch 603 switches from the off state to the on state, and if the interlock switch 327 enters the on state, and an instruction to start a print job is input, the distinction process may be executed. As a result, it is possible to prevent the situation where, after the interlock switch 327 enters the on state, the door 326 is opened again, and for example, the supply of power to the motor control device 600 is disconnected during the distinction process. That is, it is possible to prevent the type of motor from being erroneously distinguished.

In a second exemplary embodiment, components similar to those in the first exemplary embodiment are not described.

Figure 12:
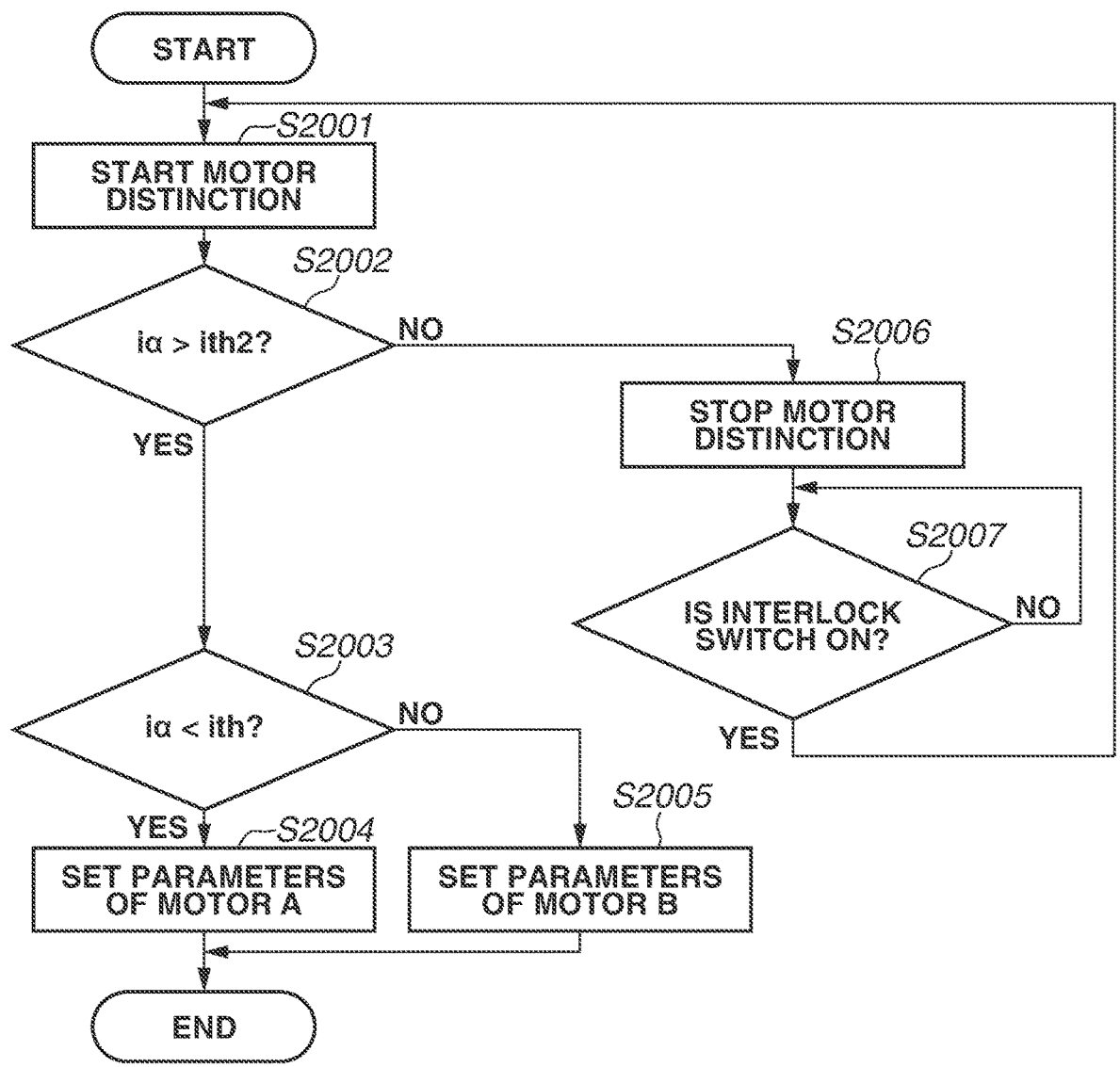
FIG. 12 is a flowchart illustrating a method for starting a distinction process according to a second exemplary embodiment.

FIG. 12 is a flowchart illustrating the distinction process. The processing of the flowchart is executed by the CPU 151a if the main power switch 603 switches from an off state to an on state.

If the main power switch 603 switches from the off state to the on state, then in step S2001, the CPU 151a starts the distinction process. Specifically, the CPU 151a sets the duty cycle of PWM+ to the predetermined value and applies a voltage to each coil of the motor 509.

Next, if the current value iα is greater than a threshold ith2 in step S2002 (YES in step S2002), the processing proceeds to step S2003. The threshold ith2 is set to a value smaller than the threshold ith and smaller than the minimum value of a current flowing through each coil of the motor A due to the PWM signal set to the predetermined value. The current value iα being less than or equal to the threshold ith2 corresponds to the fact that the interlock switch 327 is in an off state, and power is not supplied to the motor control device 600.

If the current value iα is less than the threshold ith in step S2003 (YES in step S2003), then in step S2004, the CPU 151a determines that the motor 509 connected to the motor control device 600 is the motor A. Then, the CPU 151a sets the control values in the motor control device 600 to the control values corresponding to the motor A.

If, on the other hand, the current value iα is greater than or equal to the threshold ith in step S2003 (NO in step S2003), then in step S2005, the CPU 151a determines that the motor 509 connected to the motor control device 600 is the motor B. Then, the CPU 151a sets the control values in the motor control device 600 to the control values corresponding to the motor B.

In, on the other hand, the current value iα is less than or equal to the threshold ith2 in step S2002 (NO in step S2002), then in step S2006, the CPU 151a stops the distinction process. That is, the CPU 151a discards data in this processing.

Then, if the interlock switch 327 enters the on state in step S2007 (YES in step S2007), the processing returns to step S2001.

As described above, in the present exemplary embodiment, if the main power switch 603 switches from an off state to an on state, the CPU 151a starts the distinction process. If the current value iα is less than or equal to the threshold ith2, the CPU 151a stops the distinction process. If the interlock switch 327 enters an on state, the CPU 151a starts the distinction process. That is, if it is detected that the interlock switch 327 is in an off state during the period when the executed distinction process is executed, the distinction result of the executed distinction process is not used. The result of the distinction process executed during the period when the interlock switch 327 is in the on state is used to set the control values. As a result, it is possible to prevent an operation for distinguishing the type of motor from being executed in the state where a current is not supplied to a motor due to the state where an interlock switch is disconnected. That is, it is possible to prevent the type of motor from being erroneously distinguished.

Figure 13:
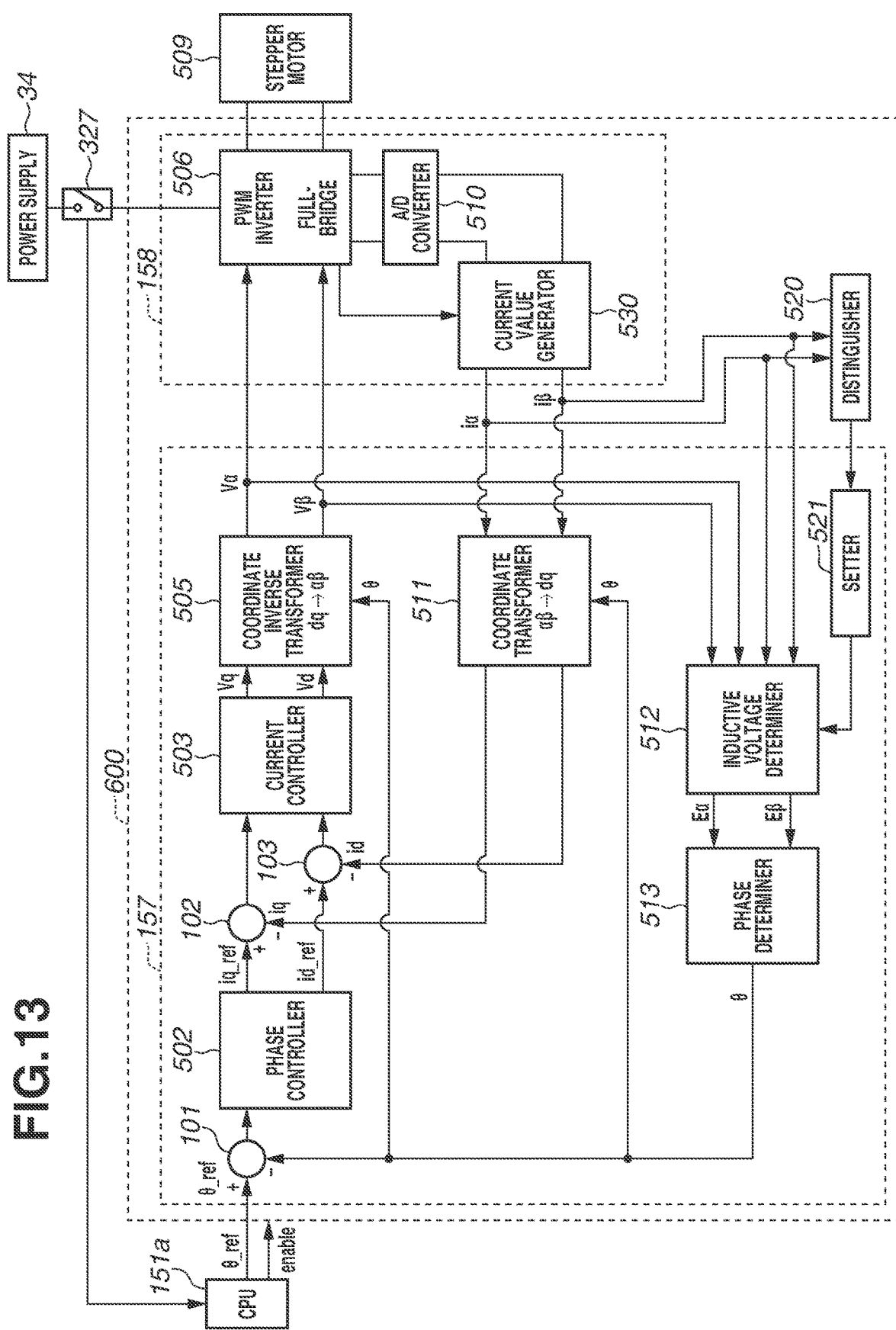
FIG. 13 is a block diagram illustrating a variation of the configuration of the motor control device.

In the first and second exemplary embodiments, the CPU 151a distinguishes the type of motor based on the current value iα and sets the control values based on the distinction result. The present disclosure, however, is not limited to this. For example, as illustrated in FIG. 13, a distinguisher 520 provided in the motor control device 600 may distinguish the type of motor based on the current value iα, and a setter 521 provided in the motor control device 600 may set the control values based on the distinction result of the distinguisher 520.

In the first and second exemplary embodiments, the type of motor is distinguished by the method illustrated in FIG. 9. The present disclosure, however, is not limited to this. For example, the type of motor may be distinguished by measuring the resistance value R and the inductance value L of each coil of a motor.

In the first and second exemplary embodiments, if the main power switch 603 is switched from an off state to an on state, the first circuit 604 switches the second power switch 606 to an on state. The present disclosure, however, is not limited to this. For example, after the main power switch 603 is switched from the off state to the on state, and if a power switch 152a provided in the operation unit 152 is pressed by the user and enters an on state, the first circuit 604 may switch the second power switch 606 to the on state. In such a configuration, if the first circuit 604 brings the second power switch 606 into the on state due to the fact that the power switch 152a is pressed and enters the on state, the processing of the flowchart illustrated in FIG. 11 is executed by the CPU 151a in the first exemplary embodiment, or the processing of the flowchart illustrated in FIG. 12 is executed by the CPU 151a in the second exemplary embodiment.

Figure 14:
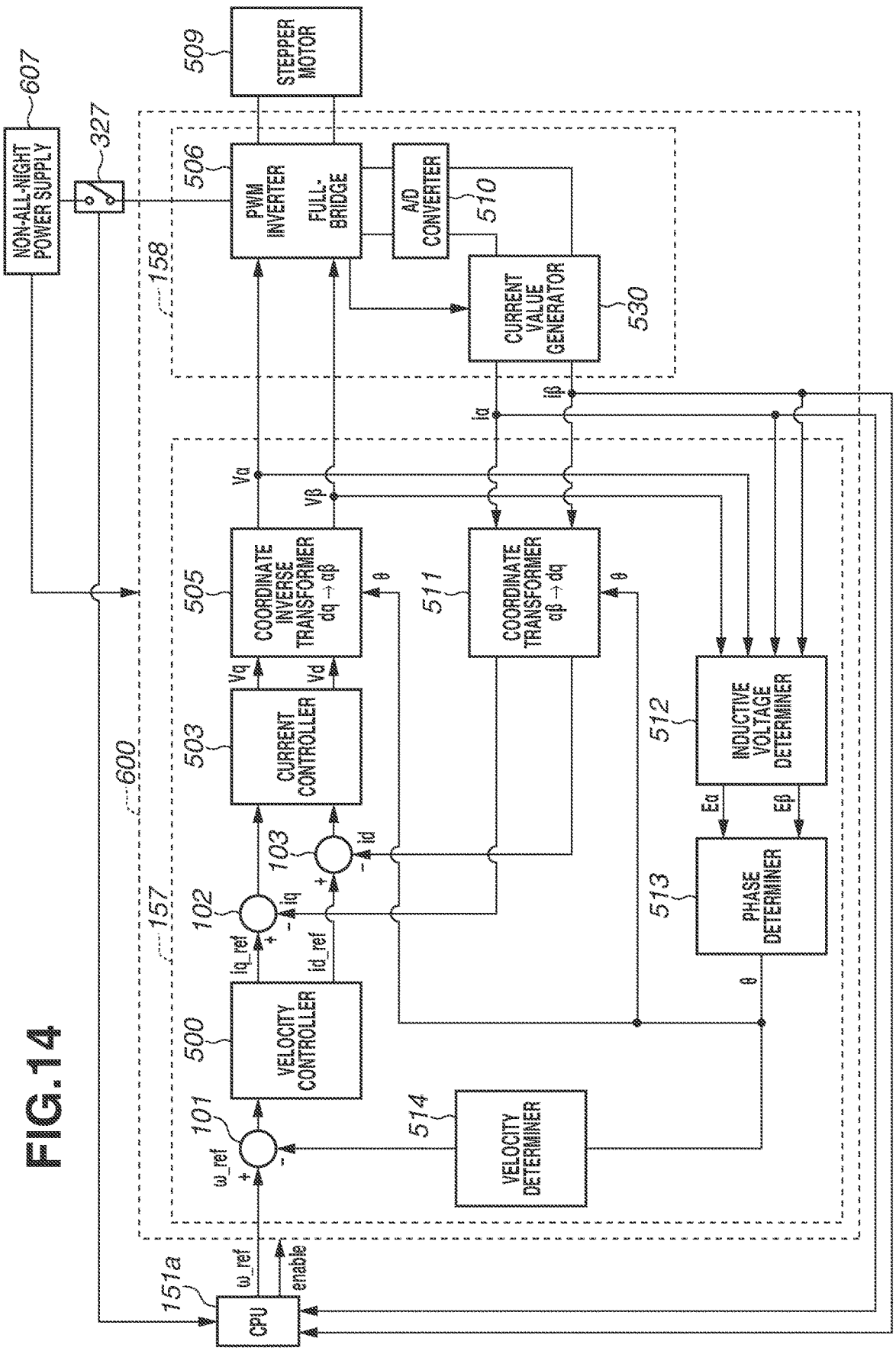
FIG. 14 is a block diagram illustrating a configuration of a motor control device that performs velocity feedback control.

In the vector control according to the first and second exemplary embodiments, the motor 509 is controlled by performing the phase feedback control. The present disclosure, however, is not limited to this. For example, a configuration may be employed in which the motor 509 is controlled by feeding back a rotational velocity ω of the rotor 402. Specifically, as illustrated in FIG. 14, a velocity controller 500 is provided within the motor control unit 157, and the CPU 151a outputs an instruction velocity ω ref indicating a target velocity of the rotor 402. A velocity determiner 514 is provided within the motor control unit 157, and based on a change over time in the rotational phase θ output from the phase determiner 513, the velocity determiner 514 determines the rotational velocity ω. A configuration is employed in which the velocity controller 500 generates the q-axis current instruction value iq_ref and the d-axis current instruction value id_ref so that the deviation between the rotational velocity ω and the instruction velocity ω ref becomes small. Then, the velocity controller 500 outputs the q-axis current instruction value iq_ref and the d-axis current instruction value id_ref. A configuration may be employed in which the motor 509 is controlled by performing such velocity feedback control. In such a configuration, since a rotational velocity is fed back, it is possible to perform control so that the rotational velocity of a rotor becomes a predetermined velocity. Thus, in an image forming apparatus, vector control using velocity feedback control is applied to a motor for driving a load (e.g., a photosensitive drum or a conveying belt) for which the rotational velocity needs to be controlled to be a constant velocity to appropriately form an image on a recording medium. As a result, it is possible to appropriately form an image on a recording medium.

In the first and second exemplary embodiments, a stepper motor is used as a motor for driving a load. Alternatively, another motor, such as a direct current (DC) motor, may be used. The motor is not limited to a two-phase motor, and may be another motor such as a three-phase motor.

In the first and second exemplary embodiments, a permanent magnet is used as a rotor. The present disclosure, however, is not limited to this.

The photosensitive drum 309, the developing device 314, and the fixing device 318 are included in an image forming unit.

According to the present disclosure, it is possible to prevent the type of motor from being erroneously distinguished.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2020-019178, which was filed on Feb. 6, 2020 and which is hereby incorporated by reference herein in its entirety.

What is claimed is:

1. An image forming apparatus including an image forming unit configured to form an image on a recording medium, the image forming apparatus comprising:
a power supply circuit to which power is supplied from a commercial power supply;
a driving circuit configured to supply a current supplied from the power supply circuit to a coil of a motor connected to the driving circuit;
an opening/closing unit configured to be opened and closed to access inside of the image forming apparatus;
a first switch configured to switch to a connected state where the power supply circuit and the driving circuit are connected together, and a disconnected state where the power supply circuit is disconnected from the driving circuit, the first switch being in the connected state in a state where the opening/closing unit is closed, and being in the disconnected state in a state where the opening/closing unit is opened; and at least one processor configured:
- to detect a current flowing through the coil;
- to determine a rotational phase of a rotor of the motor using the detected current and a set control value;
- to control the driving circuit, wherein the at least one processor includes a first mode for executing vector control for controlling the driving circuit based on a torque current component that is a current component represented in a rotating coordinate system based on the determined rotational phase and is also a current component that generates a torque in the rotor of the motor, and a second mode for controlling the driving circuit based on a target value of a current that is to be supplied to the coil, the target value set to a value determined in advance;
- to execute discriminating a type of the motor connected to the driving circuit based on the detected current in the second mode; and
- to set the control value based on a result of the discriminating,
- wherein the result of the discriminating based on the detected current in a state where the first switch is in the disconnected state is not used to set the control value, and
- wherein the at least one processor sets the control value based on the result of the discriminating based on the detected current in a state where the first switch is in the connected state.

2. The image forming apparatus according to claim 1, further comprising a second detector configured to detect a state of the first switch,
- wherein the result of the discriminating based on the detected current in a state where the second detector detects that the first switch is in the disconnected state is not used to set the control value, and
- wherein the at least one processor sets the control value based on the result of the discriminating based on the detected current in a state where the second detector detects that the first switch is in the connected state.

3. The image forming apparatus according to claim 1, further comprising a second switch configured to be operated by a user and switch to a first state where power is supplied from the commercial power supply to the power supply circuit, and a second state where power is not supplied from the commercial power supply to the power supply circuit,
- wherein the discriminating is executed after the second switch switches from the second state to the first state, and before the motor is driven in the first mode first after the second switch switches from the second state to the first state.

4. The image forming apparatus according to claim 3, wherein the second switch is a switch configured to switch from the second state to the first state, whereby power is supplied to the at least one processor.

5. The image forming apparatus according to claim 3, wherein the second mode is executed after the second switch switches from the second state to the first state, and before the motor is driven in the first mode first after the second switch switches from the second state to the first state.

6. The image forming apparatus according to claim 1, wherein the opening/closing unit is an opening/closing unit for exposing, to outside the image forming apparatus, a conveying path in which the recording medium is conveyed.

7. The image forming apparatus according to claim 1, wherein the first mode is a mode for executing the vector control so that a deviation between the determined rotational phase and an instruction phase indicating a target phase of the rotor becomes small.

8. The image forming apparatus according to claim 1, wherein the at least one processor is configured to determine a rotational velocity of the rotor,
- wherein the first mode is a mode for executing the vector control so that a deviation between the determined rotational velocity and an instruction velocity indicating a target velocity of the rotor becomes small.

9. The image forming apparatus according to claim 1, wherein the control value includes information indicating an inductance value of the coil of the motor.

10. The image forming apparatus according to claim 1, wherein the control value includes information indicating a resistance value of the coil of the motor.

11. An image forming apparatus including an image forming unit configured to form an image on a recording medium, the image forming apparatus comprising:
- a power supply circuit to which power is supplied from a commercial power supply;
- a driving circuit configured to supply a current supplied from the power supply circuit to a coil of a motor connected to the driving circuit;
- an opening/closing unit configured to be opened and closed to access inside of the image forming apparatus;
- a first switch configured to switch to a connected state where the power supply circuit and the driving circuit are connected together, and a disconnected state where the power supply circuit is disconnected from the driving circuit, the first switch being in the connected state in a state where the opening/closing unit is closed, and being in the disconnected state in a state where the opening/closing unit is opened; and
- at least one processor configured:
  - to detect a current flowing through the coil;
  - to determine a rotational phase of a rotor of the motor;
  - to control the driving circuit, wherein the at least one processor includes a first mode for controlling the driving circuit based on a target value of a current that is to be supplied to the coil, the target value set using feedback control based on a deviation between the determined rotational phase and an instruction phase indicating a target phase of the rotor of the motor, and a second mode for controlling the driving circuit based on a target value of a current that is to be supplied to the coil, the target value set to a value determined in advance;
  - to execute discriminating a type of the motor connected to the driving circuit based on the detected current in the second mode; and
  - to set a gain value in the feedback control based on a result of the discriminating,
- wherein the result of the discriminating based on the detected current in a state where the first switch is in the disconnected state is not used to set the gain value, and
- wherein the at least one processor sets the gain value based on the result of the discriminating based on the detected current in a state where the first switch is in the connected state.

12. An image forming apparatus including an image forming unit configured to form an image on a recording medium, the image forming apparatus comprising:
- a power supply circuit to which power is supplied from a commercial power supply;

a driving circuit configured to supply a current supplied from the power supply circuit to a coil of a motor connected to the driving circuit;
an opening/closing unit configured to be opened and closed to access inside of the image forming apparatus;
a first switch configured to switch to a connected state where the power supply circuit and the driving circuit are connected together, and a disconnected state where the power supply circuit is disconnected from the driving circuit, the first switch being in the connected state in a state where the opening/closing unit is closed, and being in the disconnected state in a state where the opening/closing unit is opened; and
at least one processor configured:
to detect a current flowing through the coil;
to determine a rotational velocity of a rotor of the motor;
to control the driving circuit, wherein the at least one processor includes a first mode for controlling the driving circuit based on a target value of a current that is to be supplied to the coil, the target value set using feedback control based on a deviation between the determined rotational velocity and an instruction velocity indicating a target velocity of the rotor of the motor, and a second mode for controlling the driving circuit based on a target value of a current that is to be supplied to the coil, the target value set to a value determined in advance;
to execute discriminating a type of the motor connected to the driving circuit based on the detected current in the second mode; and
to set a gain value in the feedback control based on a result of the discriminating,
wherein the result of the discriminating based on the detected current in a state where the first switch is in the disconnected state is not used to set the gain value,
wherein the at least one processor sets the gain value based on the result of the discriminating based on the detected current in a state where the first switch is in the connected state.

13. An image forming apparatus including an image forming unit configured to form an image on a recording medium, the image forming apparatus comprising:
a power supply circuit to which power is supplied from a commercial power supply;
a driving circuit configured to supply a current supplied from the power supply circuit to a coil of a motor connected to the driving circuit;
an opening/closing unit configured to be opened and closed to access inside of the image forming apparatus;
a first switch configured to switch to a connected state where the power supply circuit and the driving circuit are connected together, and a disconnected state where the power supply circuit is disconnected from the driving circuit, the first switch being in the connected state in a state where the opening/closing unit is closed, and being in the disconnected state in a state where the opening/closing unit is opened; and
at least one processor configured:
to detect a current flowing through the coil;
to determine a rotational phase of a rotor of the motor using the detected current and a set control value;
to control the driving circuit, wherein the at least one processor includes a first mode for executing vector control for controlling the driving circuit based on a torque current component that is a current component represented in a rotating coordinate system based on the detected rotational phase and is also a current component that generates a torque in the rotor of the motor, and a second mode for controlling the driving circuit based on a target value of a current that is to be supplied to the coil, the target value set to a value determined in advance;
to execute discriminating a type of the motor connected to the driving circuit based on the detected current in the second mode, and
to set the control value based on a result of the discriminating,
wherein in a case where the first switch is in the connected state, the at least one processor executes the discriminating, and in a case where the first switch is in the disconnected state, the at least one processor does not execute the discriminating.

14. The image forming apparatus according to claim 13, further comprising a notification unit configured to, in a case where the first switch is in the disconnected state, give a notification that the opening/closing unit is in a state where the opening/closing unit is opened,
wherein in a case where the first switch enters the connected state after the notification unit gives the notification, the at least one processor executes the discriminating.

15. The image forming apparatus according to claim 13, further comprising a second detector configured to detect a state of the first switch,
wherein in a case where the second detector detects that the first switch is in the connected state, the at least one processor executes the discriminating, and in a case where the second detector detects that the first switch is in the disconnected state, the at least one processor does not execute the discriminating.

16. The image forming apparatus according to claim 13, further comprising a second switch configured to be operated by a user and switch to a first state where power is supplied from the commercial power supply to the power supply circuit, and a second state where power is not supplied from the commercial power supply to the power supply circuit,
wherein the discriminating is executed after the second switch switches from the second state to the first state, and before the motor is driven in the first mode first after the second switch switches from the second state to the first state.

17. The image forming apparatus according to claim 16, wherein the second mode is executed after the second switch switches from the second state to the first state, and before the motor is driven in the first mode first after the second switch switches from the second state to the first state.

18. The image forming apparatus according to claim 16, wherein the second switch is a switch configured to switch from the second state to the first state, whereby power is supplied to the at least one processor.

19. The image forming apparatus according to claim 13, wherein the opening/closing unit is an opening/closing unit for exposing, to outside the image forming apparatus, a conveying path in which the recording medium is conveyed.

20. The image forming apparatus according to claim 13, wherein the first mode is a mode for executing the vector control so that a deviation between the determined rotational phase and an instruction phase indicating a target phase of the rotor becomes small.

21. The image forming apparatus according to claim 13, wherein the at least one processor is configured to determine a rotational velocity of the rotor, wherein the first mode is a mode for executing the vector control so that a deviation between the determined rotational velocity and an instruction velocity indicating a target velocity of the rotor becomes small.

22. The image forming apparatus according to claim 13, wherein the control value includes information indicating an inductance value of the coil of the motor.

23. The image forming apparatus according to claim 13, wherein the control value includes information indicating a resistance value of the coil of the motor.

24. An image forming apparatus including an image forming unit configured to form an image on a recording medium, the image forming apparatus comprising:
  a power supply circuit to which power is supplied from a commercial power supply;
  a driving circuit configured to supply a current supplied from the power supply circuit to a coil of a motor connected to the driving circuit;
  an opening/closing unit configured to be opened and closed to access inside of the image forming apparatus;
  a first switch configured to switch to a connected state where the power supply circuit and the driving circuit are connected together, and a disconnected state where the power supply circuit is disconnected from the driving circuit, the first switch being in the connected state in a state where the opening/closing unit is closed, and being in the disconnected state in a state where the opening/closing unit is opened; and
  at least one processor configured:
    to detect a current flowing through the coil;
    to determine a rotational phase of a rotor of the motor;
    to control the driving circuit, wherein the at least one processor includes a first mode for controlling the driving circuit based on a target value of a current that is to be supplied to the coil, the target value set using feedback control based on a deviation between the determined rotational phase and an instruction phase indicating a target phase of the rotor of the motor, and a second mode for controlling the driving circuit based on a target value of a current that is to be supplied to the coil, the target value set to a value determined in advance;
    to execute discriminating a type of the motor connected to the driving circuit based on the detected current in the second mode; and
    to set a gain value in the feedback control based on a result of the discriminating,
  wherein in a case where the first switch is in the connected state, the at least one processor executes discriminating, and in a case where the first switch is in the disconnected state, the at least one processor does not execute discriminating.

25. An image forming apparatus including an image forming unit configured to form an image on a recording medium, the image forming apparatus comprising:
  a power supply circuit to which power is supplied from a commercial power supply;
  a driving circuit configured to supply a current supplied from the power supply circuit to a coil of a motor connected to the driving circuit;
  an opening/closing unit configured to be opened and closed to access inside of the image forming apparatus;
  a first switch configured to switch to a connected state where the power supply circuit and the driving circuit are connected together, and a disconnected state where the power supply circuit is disconnected from the driving circuit, the first switch being in the connected state in a state where the opening/closing unit is closed, and being in the disconnected state in a state where the opening/closing unit is opened; and
  at least one processor configured:
    to detect a current flowing through the coil;
    to determine a rotational velocity of a rotor of the motor;
    to control the driving circuit, wherein the at least one processor includes a first mode for controlling the driving circuit based on a target value of a current that is to be supplied to the coil, the target value set using feedback control based on a deviation between the determined rotational velocity and an instruction velocity indicating a target velocity of the rotor of the motor, and a second mode for controlling the driving circuit based on a target value of a current that is to be supplied to the coil, the target value set to a value determined in advance;
    to execute discriminating a type of the motor connected to the driving circuit based on the detected current in the second mode; and
    to set a gain value in the feedback control based on a result of the discriminating,
  wherein in a case where the first switch is in the connected state, the at least one processor executes discriminating, and in a case where the first switch is in the disconnected state, the at least one of processor does not execute discriminating.

* * * * *